(12) United States Patent
Devries

(10) Patent No.: US 12,445,713 B2
(45) Date of Patent: Oct. 14, 2025

(54) DEVICES, METHODS, AND GRAPHICAL USER INTERFACES FOR PROVIDING A LOCK SCREEN FLASHLIGHT

(71) Applicant: APPLE INC., Cupertino, CA (US)

(72) Inventor: Nathan Devries, Alameda, CA (US)

(73) Assignee: APPLE INC., Cupertino, CA (US)

( * ) Notice: Subject to any disclaimer, the term of this patent is extended or adjusted under 35 U.S.C. 154(b) by 94 days.

(21) Appl. No.: 18/307,205

(22) Filed: Apr. 26, 2023

(65) Prior Publication Data

US 2023/0396871 A1    Dec. 7, 2023

Related U.S. Application Data

(60) Provisional application No. 63/347,875, filed on Jun. 1, 2022.

(51) Int. Cl.
| | |
|---|---|
| *H04N 23/63* | (2023.01) |
| *G06F 3/04847* | (2022.01) |
| *G06F 3/04883* | (2022.01) |
| *H04N 23/56* | (2023.01) |
| *H04N 23/62* | (2023.01) |
| *H04N 23/74* | (2023.01) |

(52) U.S. Cl.
CPC .......... *H04N 23/631* (2023.01); *H04N 23/56* (2023.01)

(58) Field of Classification Search
CPC ...... H04N 23/631; H04N 23/56; H04N 23/62; H04N 23/632; H04N 23/74; G06F 3/04883; G06F 3/04847
See application file for complete search history.

(56) References Cited

U.S. PATENT DOCUMENTS

| | | | |
|---|---|---|---|
| 2010/0238344 A1 | 9/2010 | Tsai | |
| 2015/0084513 A1* | 3/2015 | Anthony | H05B 47/155 315/131 |
| 2018/0288295 A1* | 10/2018 | Scepanovic | H04N 23/631 |

FOREIGN PATENT DOCUMENTS

| | | |
|---|---|---|
| CN | 111163223 A | 5/2020 |
| EP | 3 404 526 A1 | 11/2018 |
| KR | 10-2223305 B1 | 3/2021 |

OTHER PUBLICATIONS

International Search Report and Written Opinion of the International Searching Authority for International Application No. PCT/US2023/020195, dated Oct. 18, 2023.

* cited by examiner

*Primary Examiner* — Ahmed A Berhan
(74) *Attorney, Agent, or Firm* — Morgan, Lewis & Bockius LLP

(57) ABSTRACT

An electronic device displays on a display device, a user interface including a first user interface element, the first user interface element being associated with the illumination element, and detects a first input at a location corresponding to the first user interface element. In response to detecting the first input and in accordance with a determination that the first input meets first criteria, the device changes a beam width of a light beam emitted by an illumination element from a first beam width to a second beam width, wherein the second beam width is different from the first beam width.

56 Claims, 27 Drawing Sheets

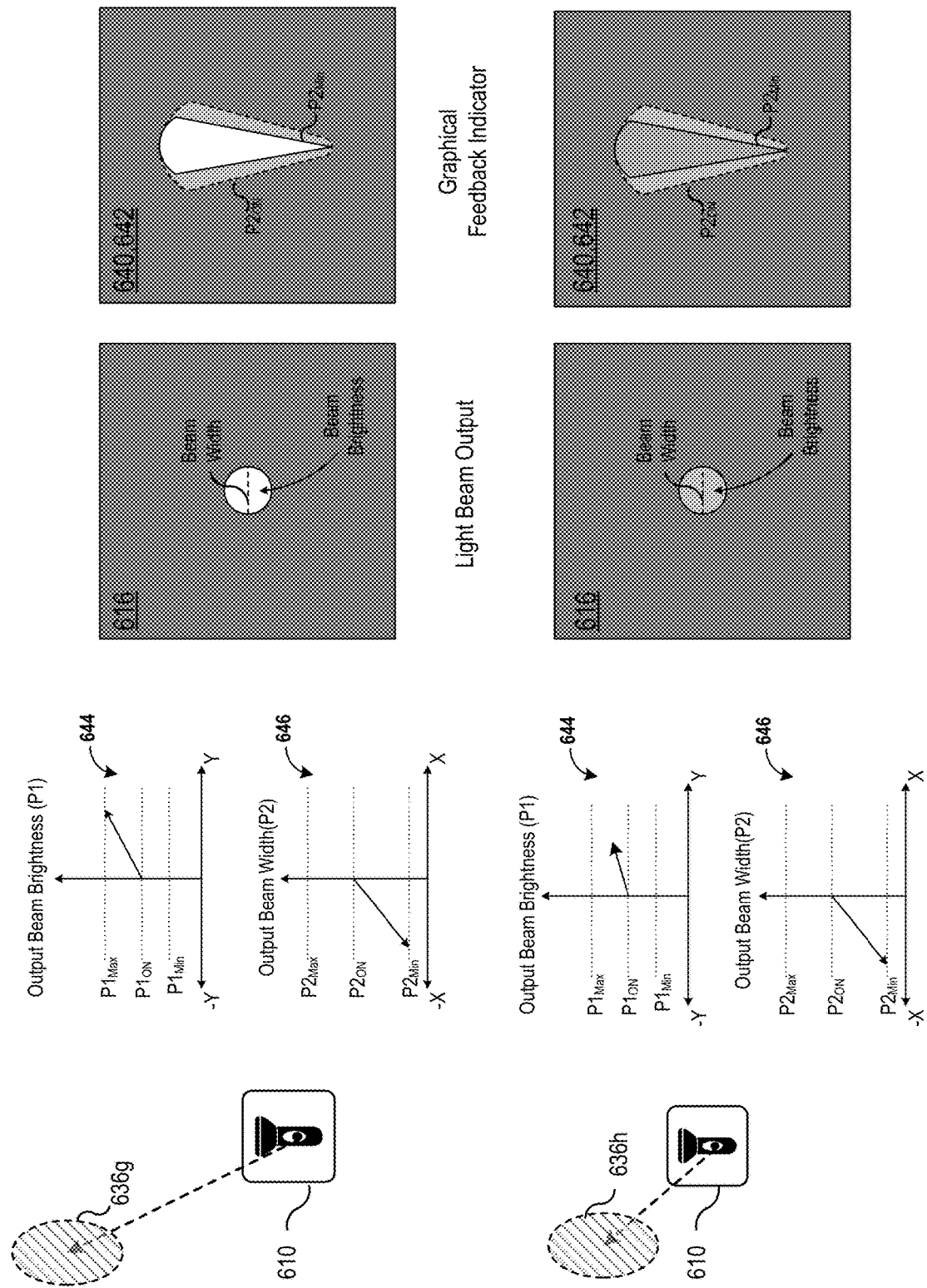

DEVICES, METHODS, AND GRAPHICAL USER INTERFACES FOR PROVIDING A LOCK SCREEN FLASHLIGHT

CROSS REFERENCE TO RELATED APPLICATIONS

This non-provisional application claims the benefit under 35 U.S.C. § 119(e) to U.S. Provisional Application No. 63/347,875, filed on Jun. 1, 2022, all of which are hereby expressly incorporated by reference into the present application.

TECHNICAL FIELD

The present disclosure relates generally to electronic devices with an illumination element, and more specifically to techniques for changing output properties, for example, beam width and brightness, of the light emitted by the illumination element.

BACKGROUND

An illumination element of an electronic device is commonly used as a flashlight or a camera flash for capturing images. In addition, user interface objects, for example, a flashlight icon or camera icon, may be accessible from a lock screen for toggling a state of a flashlight in the device, a camera application, and features within the camera application that are accessible in the device's locked mode.

BRIEF SUMMARY

Some techniques for changing output properties using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for changing output properties of an illumination element. Such methods and interfaces optionally complement or replace other methods for changing output properties. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device with a display device, one or more input elements, and an illumination element, includes displaying, via the display device, a user interface including a first user interface element, the first user interface element being associated with the illumination element. The method further includes detecting, via the one or more input elements, a first input at a location corresponding to the first user interface element, and in response to detecting the first input, in accordance with a determination that the first input meets first criteria, changing a beam width of a light beam emitted by the illumination element from a first beam width to a second beam width, wherein the second beam width is different from the first beam width.

In accordance with some embodiments, a method performed at an electronic device with a display device and one or more input devices, includes displaying, via the display, a user interface including a first user interface element, the first user interface element being associated with control of an output operation having first and second visual output properties and an active and inactive state. The method further includes detecting, via the one or more input devices, an input directed to the first user interface element, and in response to detecting the input: in accordance with a determination that the input includes movement in a first direction while the output operation is in an active state, adjusting the first visual output property, and in accordance with a determination that the input includes movement in a second direction while the output operation is in an active state, adjusting the second visual output property.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for changing output properties of an illumination element, thereby increasing the effectiveness, efficiency, and user satisfaction with such devices. Such methods and interfaces may complement or replace other methods for changing output properties of an illumination element.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for changing output properties of an illumination element. For example, changing the beam width and/or brightness of the light beam emitted from an illumination element of an electronic device Such techniques can reduce the cognitive burden on a user who changes output properties of an illumination element, thereby enhancing productivity. Further, such techniques can reduce processor and battery power otherwise wasted on redundant user inputs.

Figure 6A:
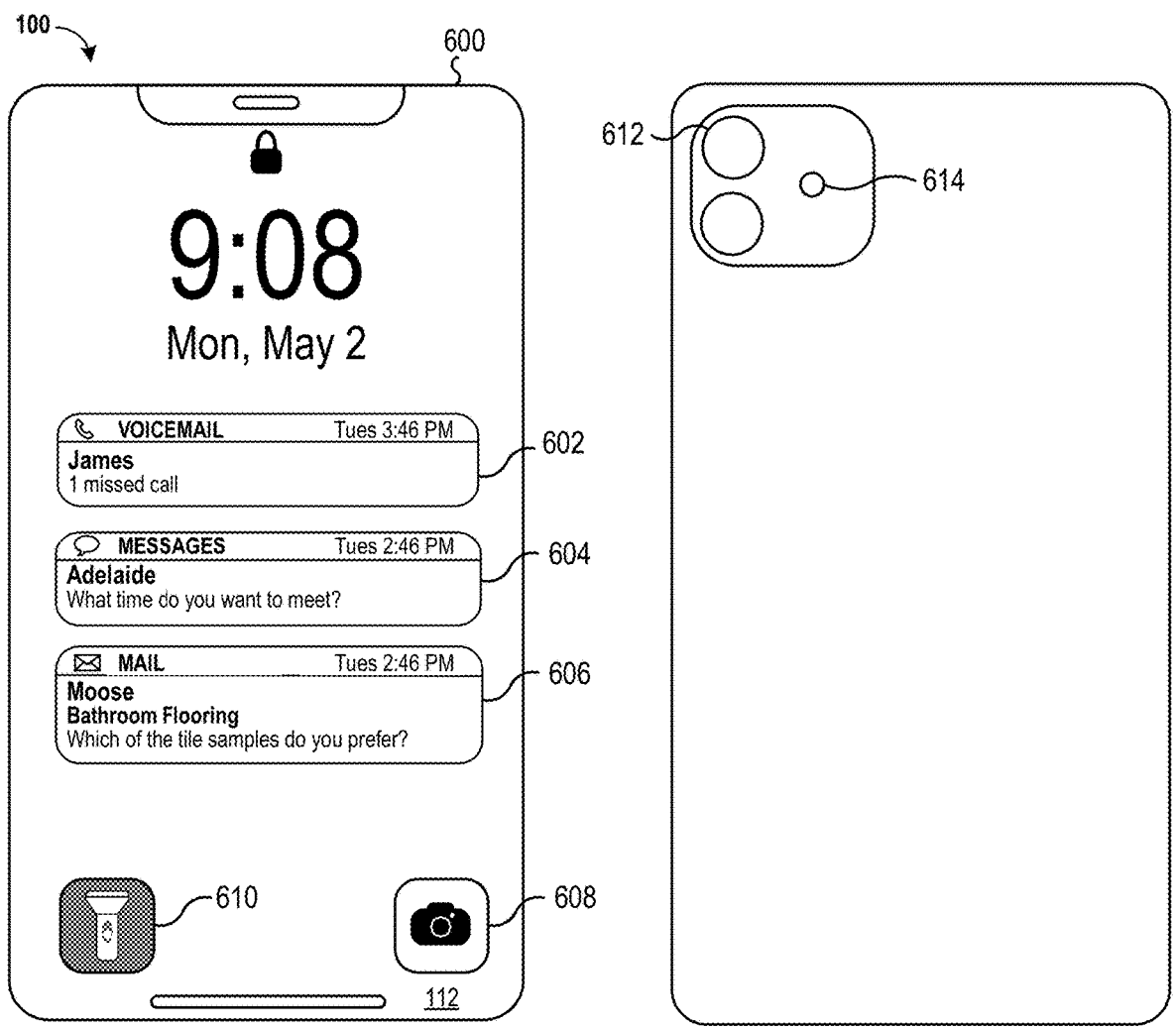
FIGS. 6A-6N illustrate example user interfaces for changing output properties of an illumination element in accordance with some embodiments.
Figure 6N:
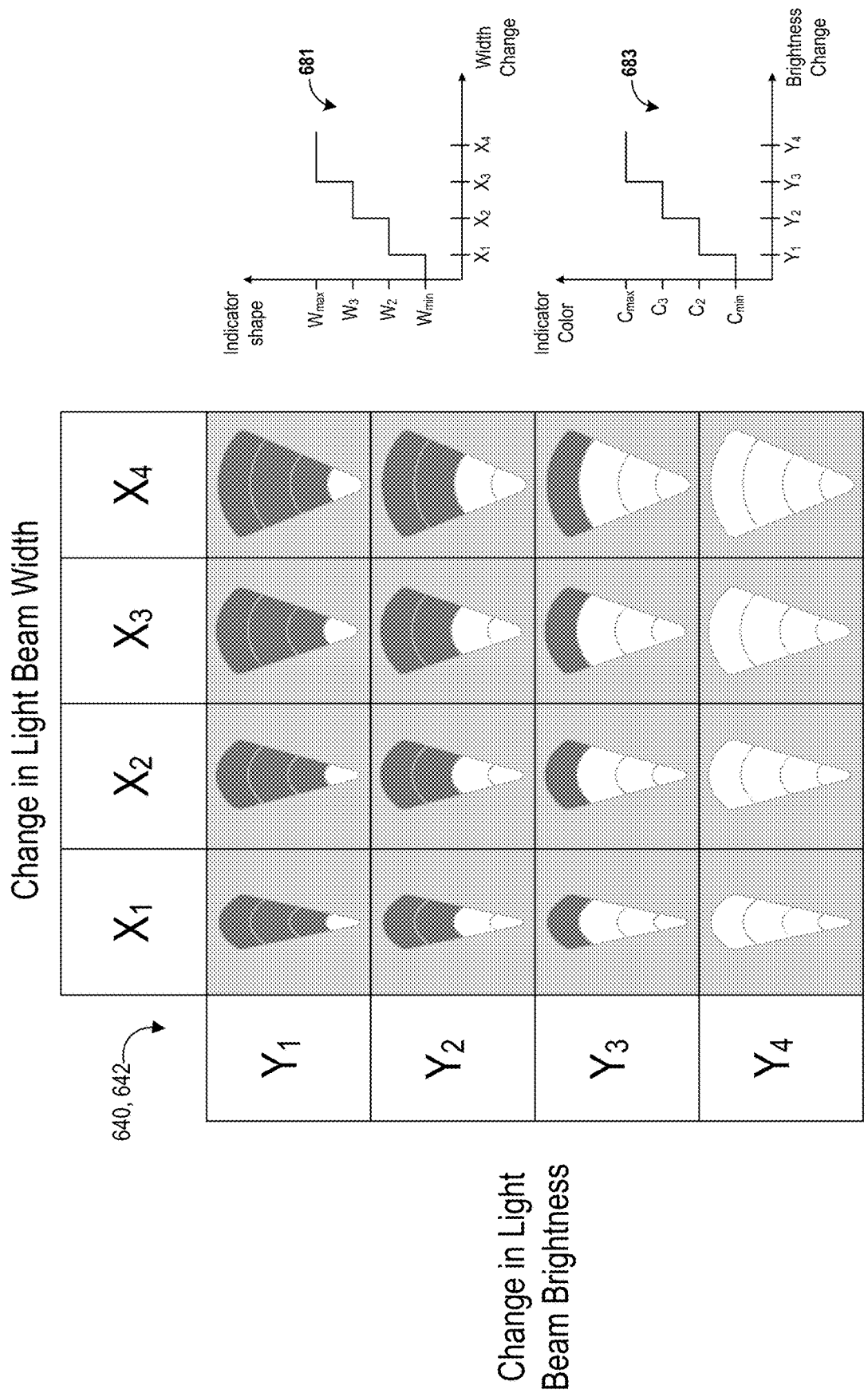
Figure 7:
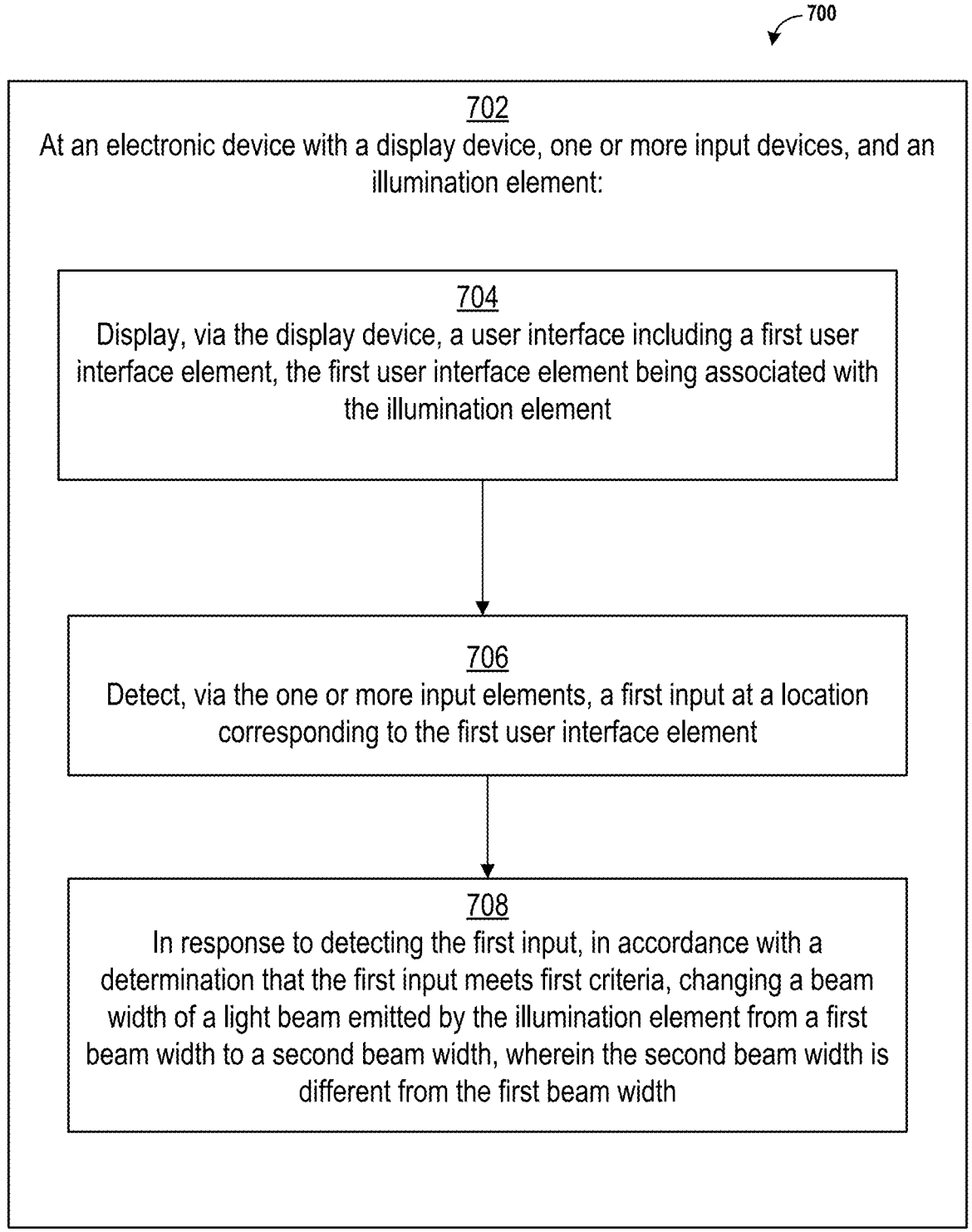
FIG. 7 is a flow diagram of a process for changing output properties of an illumination element in response to user actions on the user interface of a device, in accordance with some embodiments.
Figure 8:
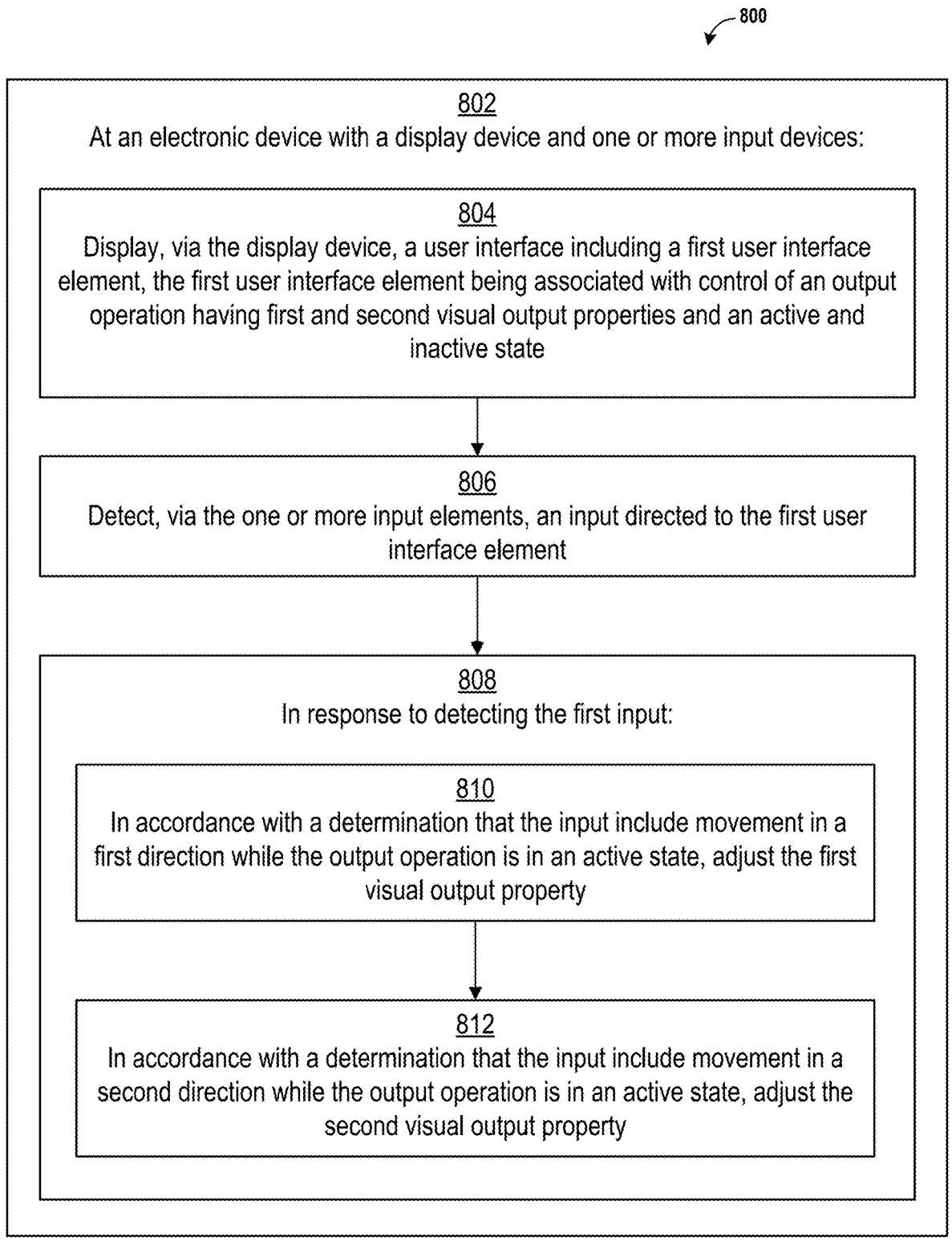
FIG. 8 is flow diagram of a process for changing output properties of an illumination element in response to user actions on the user interface of a device, in accordance with some embodiments.

Below, FIGS. 1A-1B, 2, 3, 4A-4B, 5A and 5B provide a description of exemplary devices for performing the techniques for changing output properties of an illumination element. FIGS. 6A-6N illustrate exemplary user interfaces for changing output properties of an illumination element. FIGS. 7 and 8 are flow diagrams illustrating methods of changing output properties of an illumination element in accordance with some embodiments. The user interfaces in FIGS. 6A-6N are used to illustrate the processes described below, including the processes in FIGS. 7 and 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
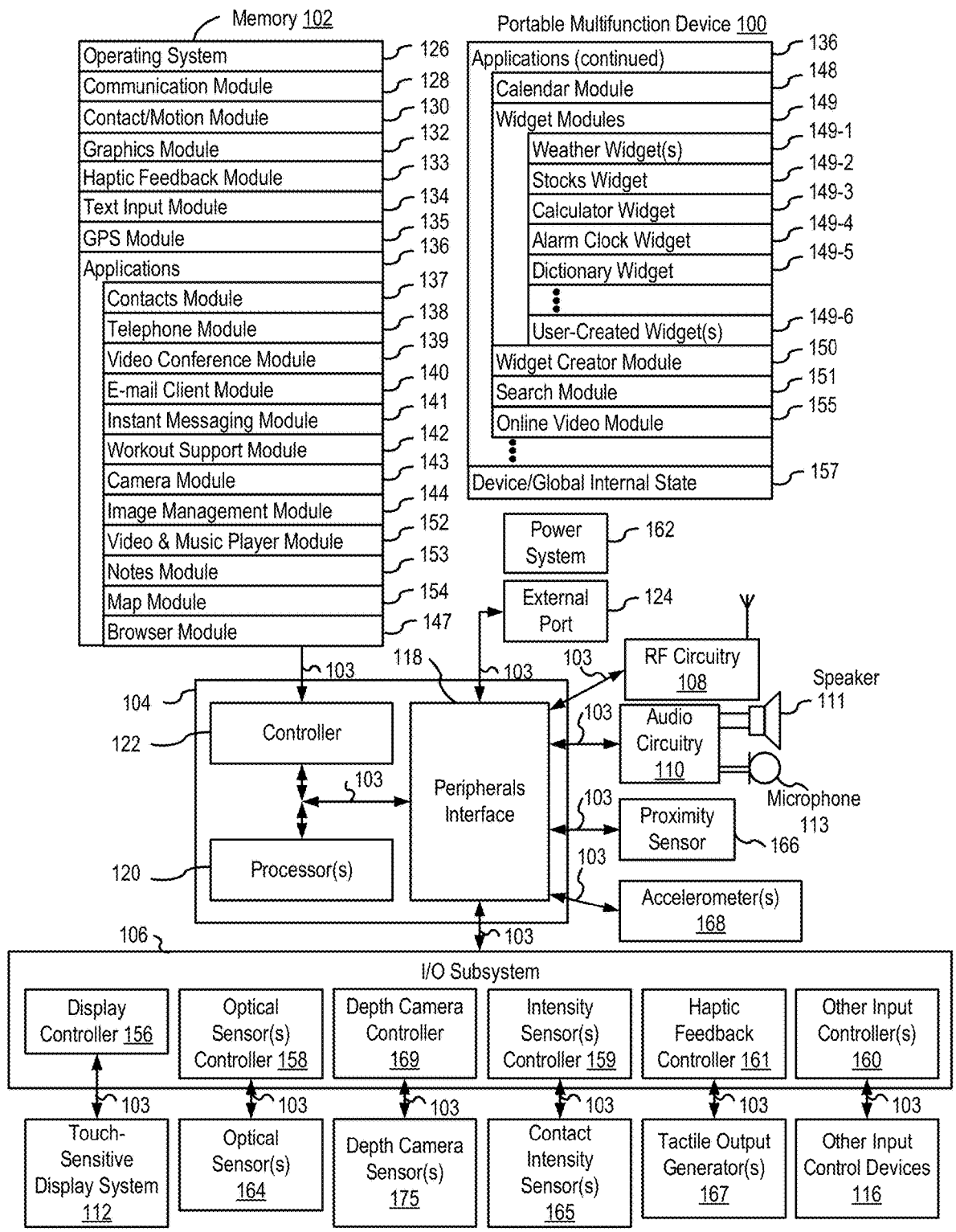
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
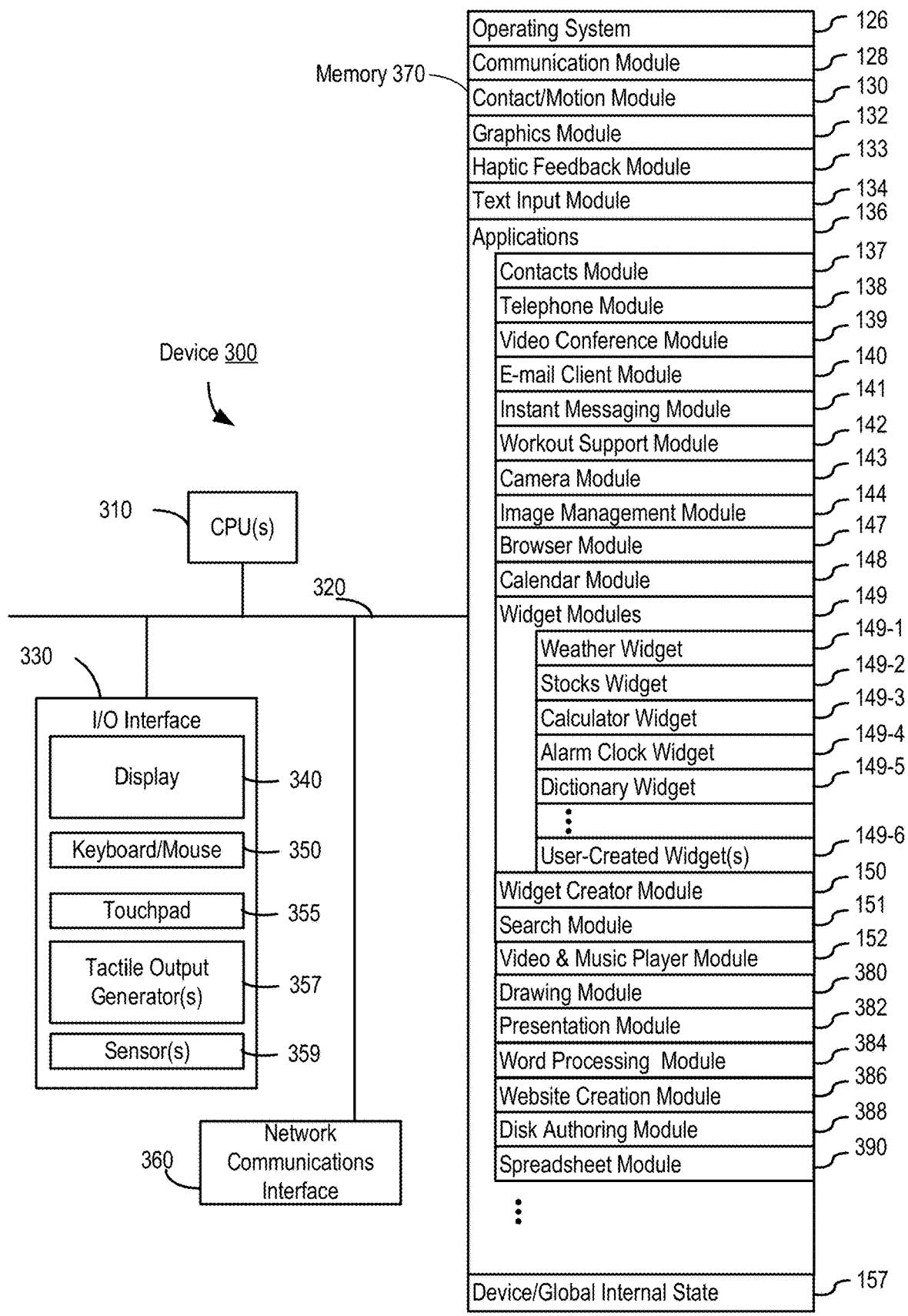
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
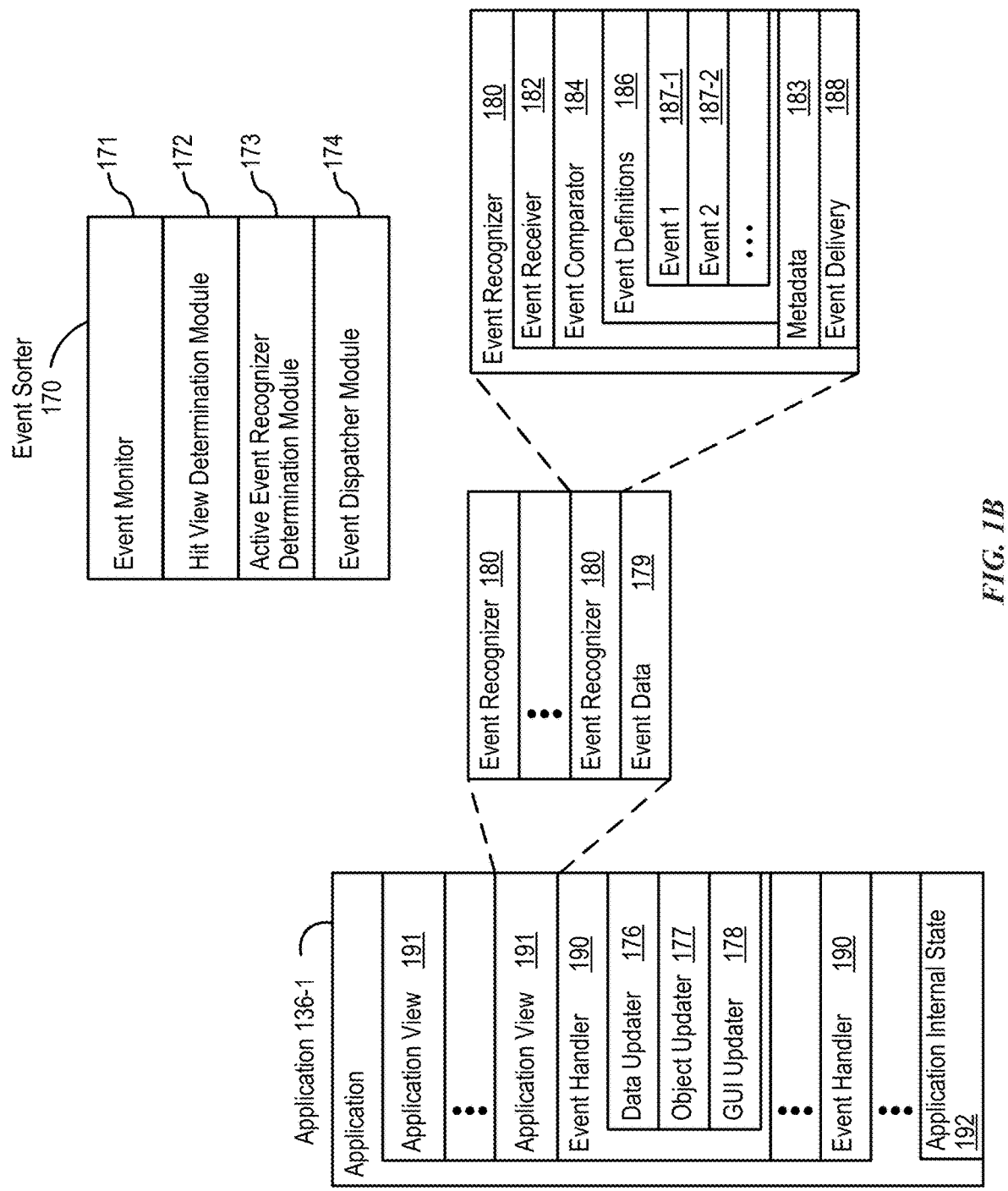
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
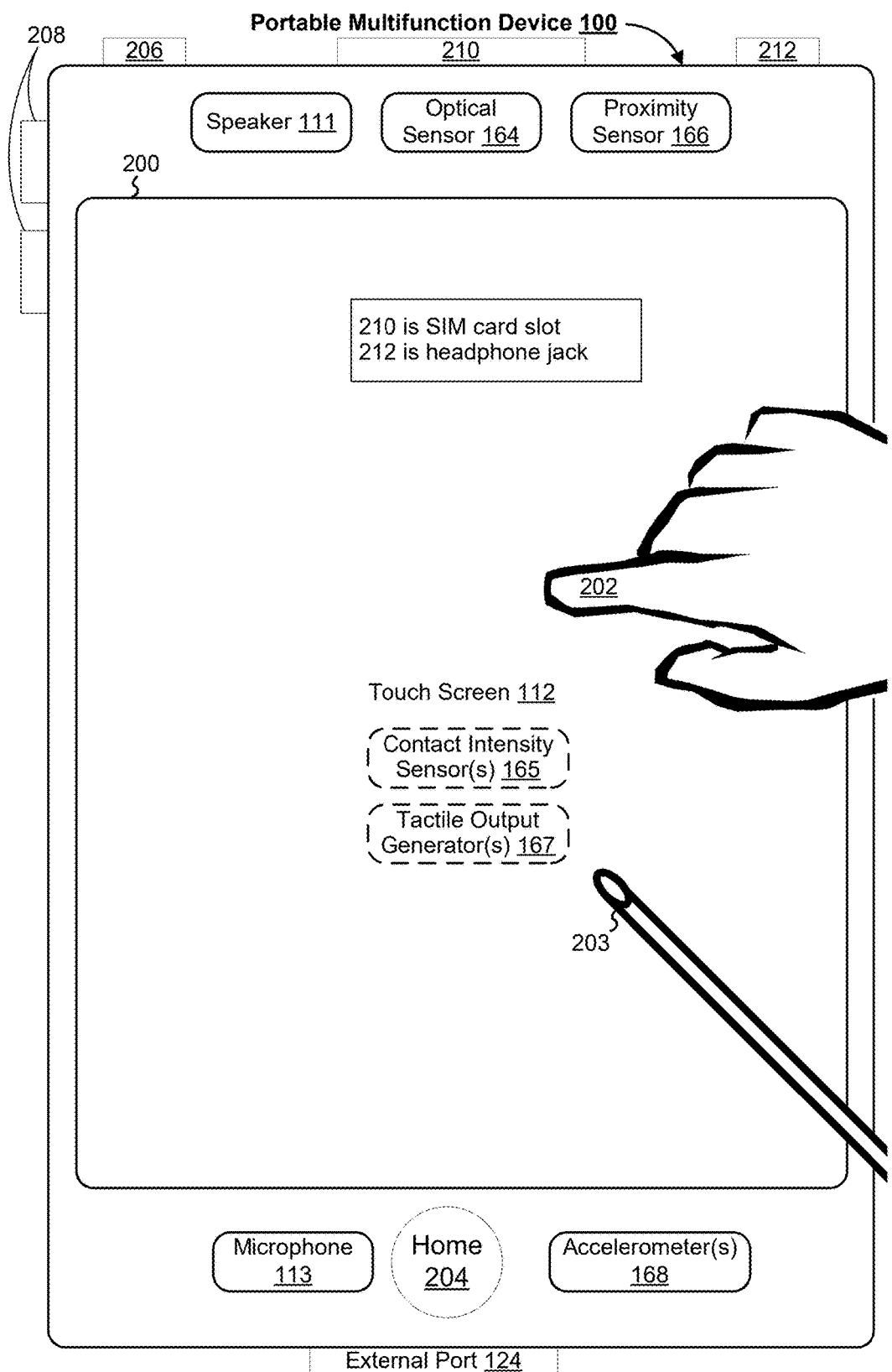
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
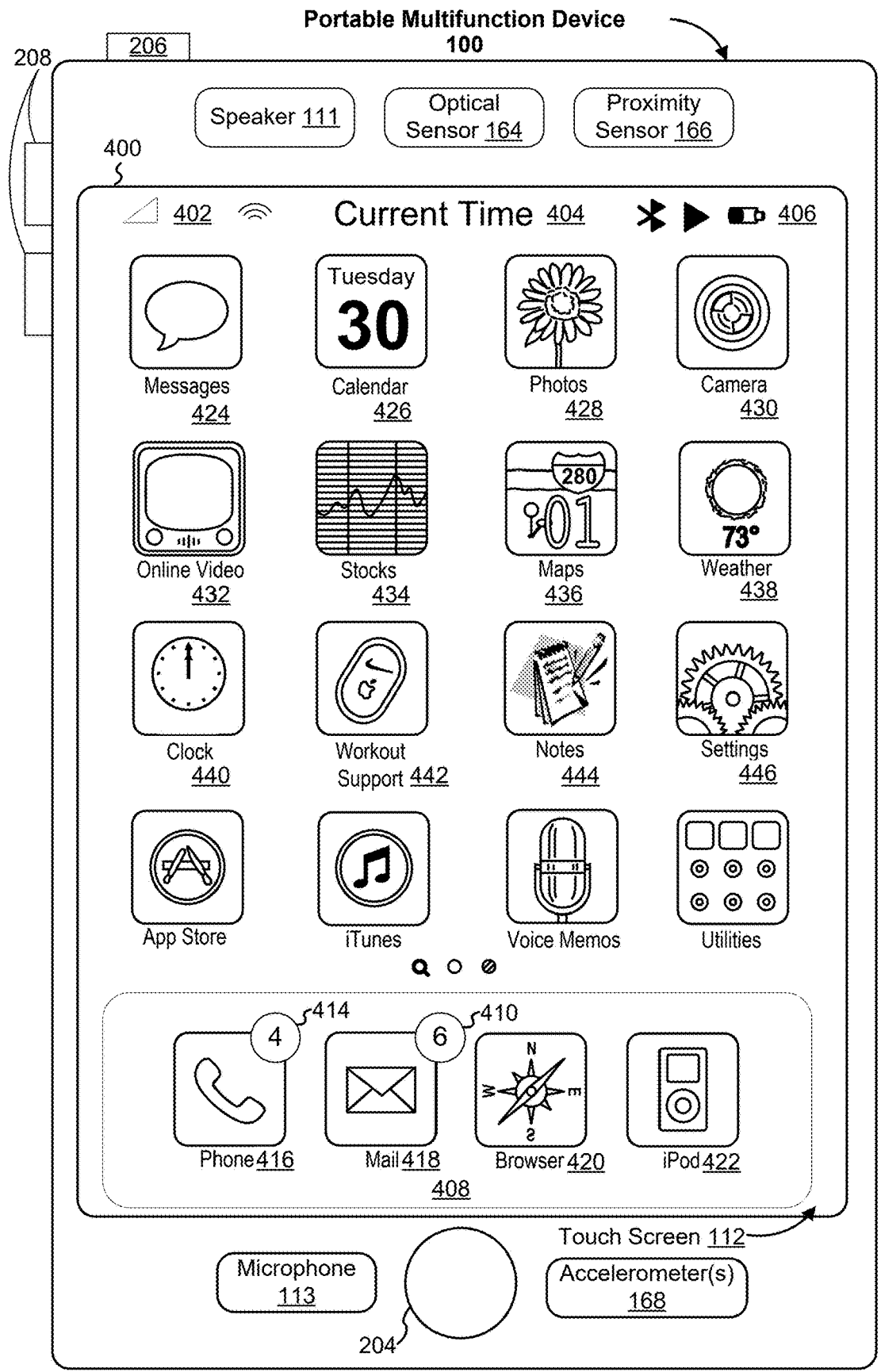
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
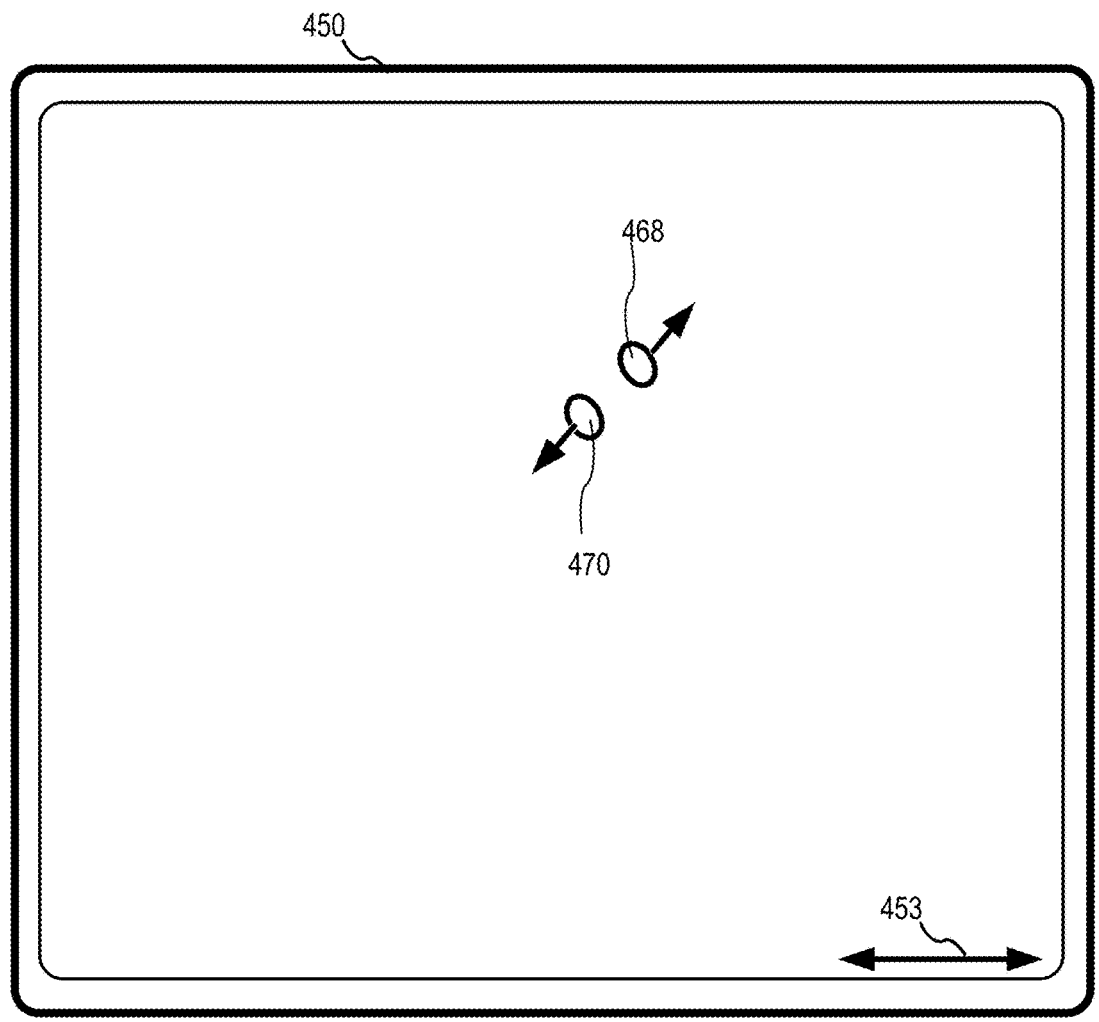
FIG. 4B illustrates an exemplary user interface for a multifunction device with a touch-sensitive surface that is separate from the display in accordance with some embodiments.
Figure 4B:
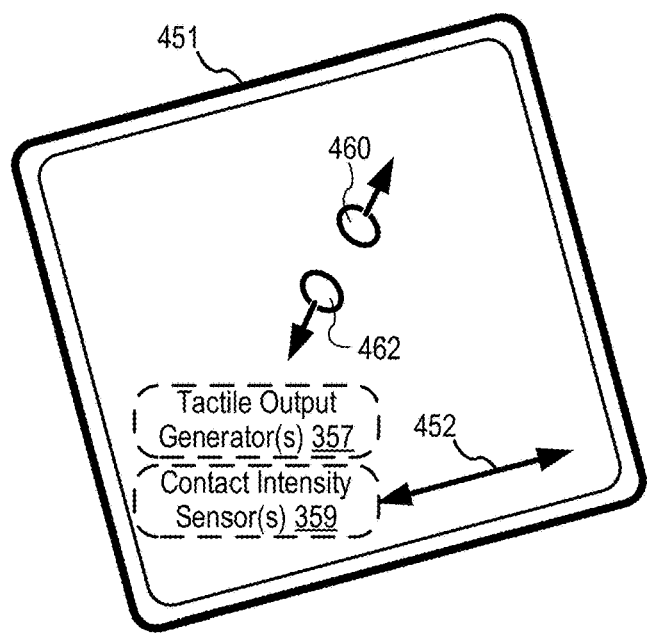

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
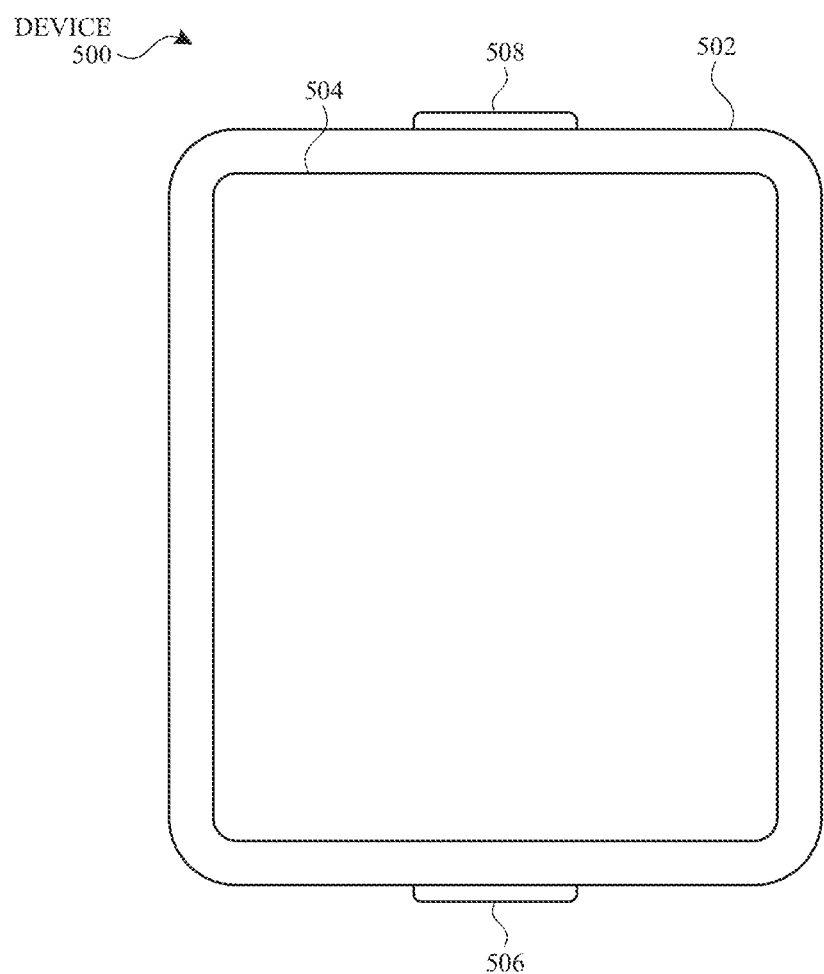
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
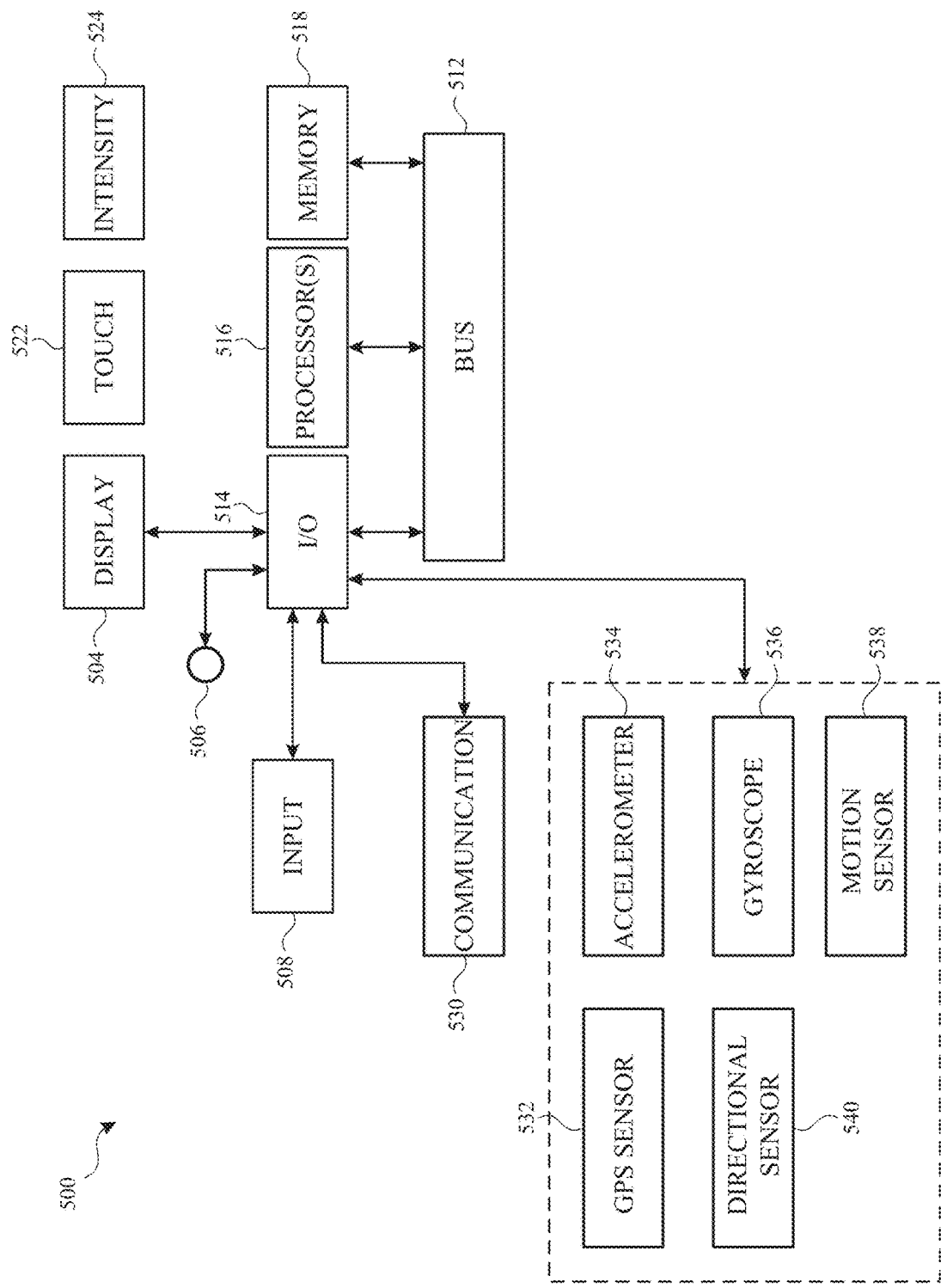
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500, with a display, a touch-sensitive surface, an illumination element, and (optionally) one or more tactile output generators for generating tactile output.

FIGS. 6A-6N illustrate exemplary user interfaces for changing output properties of an illumination element, in accordance with some embodiments. The user interfaces in these figures are used to illustrate the processes described below, including the processes in FIGS. 7 and 8 for convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while display the user interfaces shown in the figures on the display 450, along with a focus selector.

FIG. 6A illustrates a wake screen user interface 600 displayed on touch screen 112 on the front of device 100. In some embodiments, wake screen 600 is displayed upon waking device 100 from a low power state. Wake screen 600 includes a plurality of user interface elements, including a list of notifications 302, 304, and 606, flashlight icon 610, and camera icon 608. Flashlight icon 610 shows a light-colored flashlight on a darker background, corresponding to an illumination element 614 being in a deactivated state (e.g., turned off). Illumination element 614 as well as one or more lens 612 are positioned on a back side the device 100.

Figure 6B:
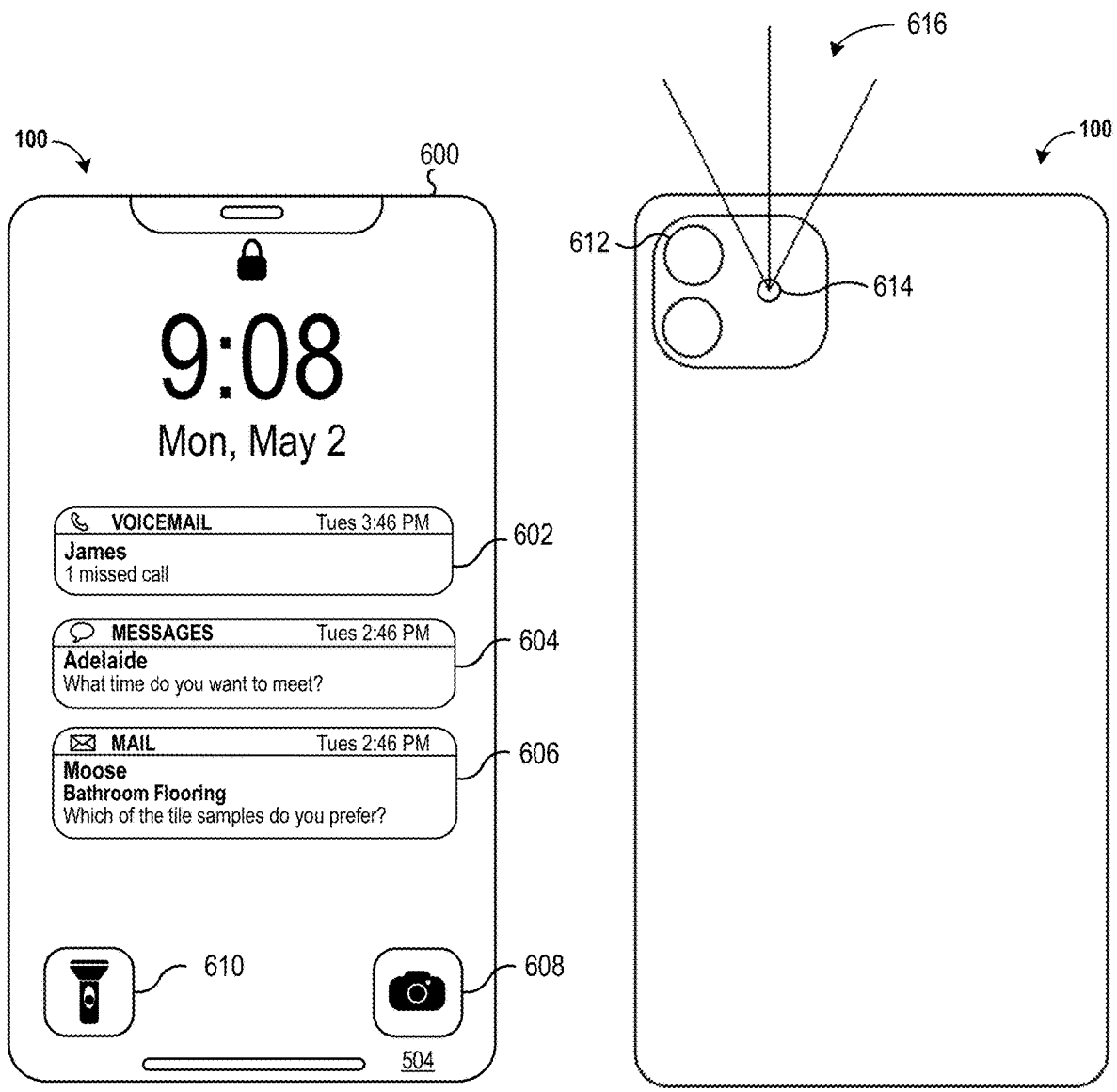

FIG. 6B illustrates a transition of the wake screen 600 from FIG. 6A when the illumination element 614 of device 100 is in an active state (e.g., turned on) as illustrated by light beams 616. The flashlight icon 610 is transitioned to a dark-colored flashlight on a lighter background.

Figure 6C:
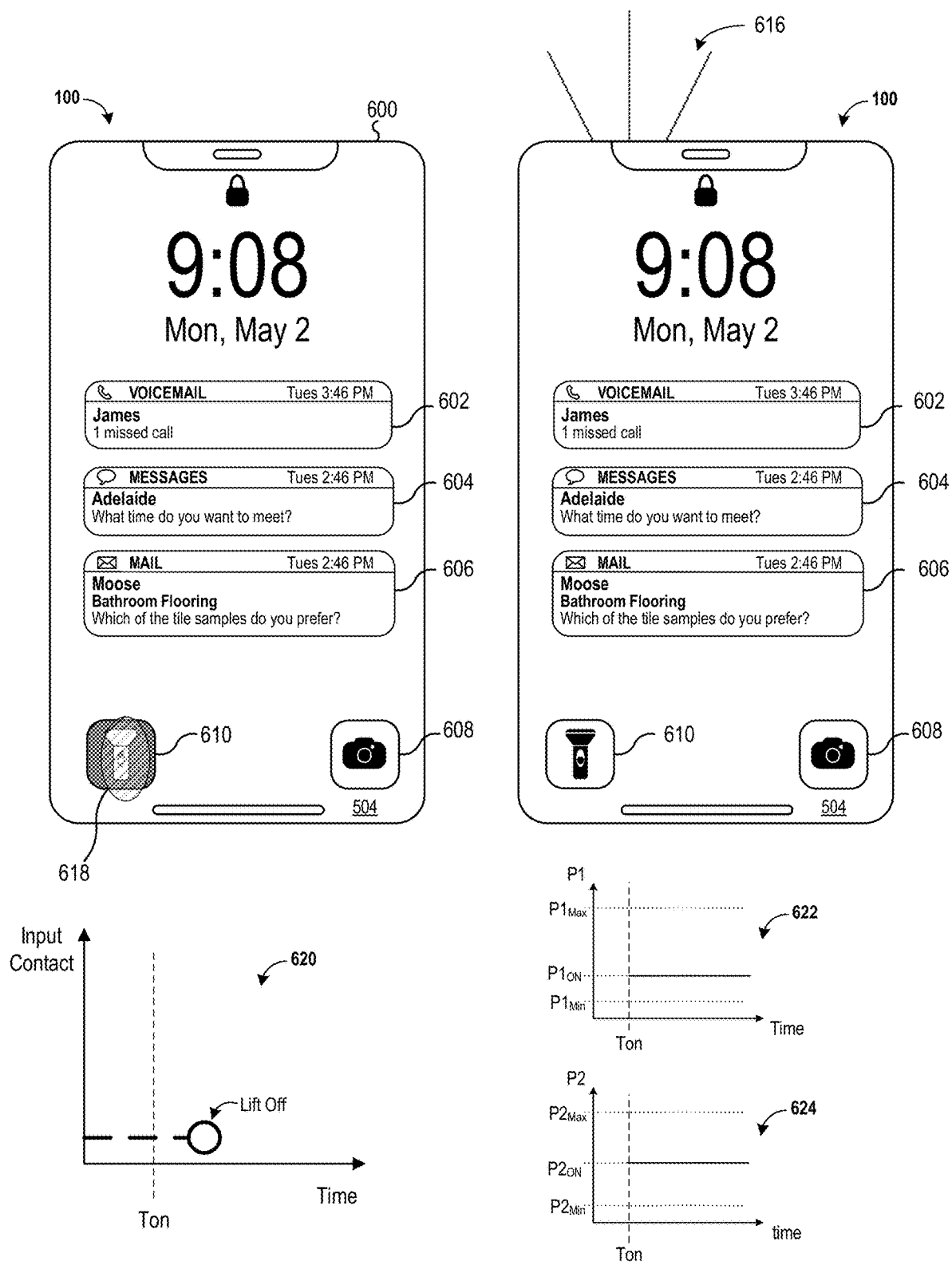

FIG. 6C illustrates a transition of the illumination element from an off state to an on state in accordance with a long press on the flashlight icon 610 on wake screen 600. Contact graph 620 shows that the duration of the contact 618 is maintained beyond the threshold $T_{on}$ before a lift off is detected. In accordance with the contact being maintained beyond the threshold $T_{on}$, the flashlight icon 610 is displayed with the on appearance of FIG. 6B and the illumination element 614 emits the light beam 616 with pre-set output properties P1 and P2, for example, brightness and beam width, respectively, as illustrated in output property graphs 622 and 624.

Figure 6D:
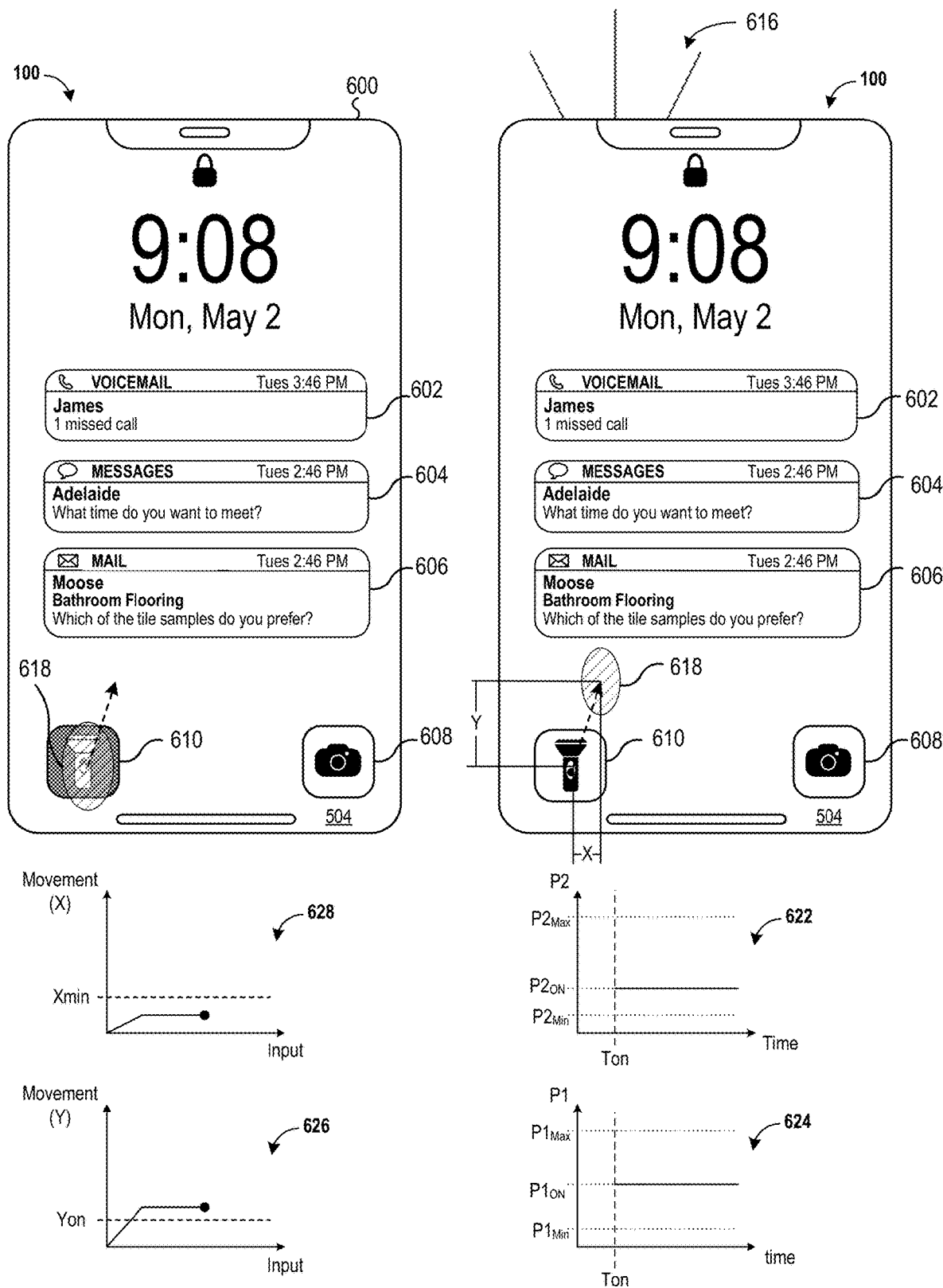

FIG. 6D illustrates a transition of the illumination element from an off state to an on state in accordance with an input 618 corresponding to the flashlight icon 610 on wake screen 600 including movement. Contact graph 626 shows that the input 618 includes movement in a first direction, Y, having a magnitude greater than the threshold Yon. Contact graph 628 shows that the input 618 also includes movement in a second direction X having a magnitude less than a minimum threshold $X_{min}$. In accordance with the input movement Y meeting the threshold $T_{on}$, the flashlight icon 610 is displayed with the on appearance of FIG. 6B and the illumination element 614 emits the light beam 616 with pre-set output properties P1 and P2, for example, brightness and beam width, respectively, as illustrated in output property graphs 622 and 624.

Figure 6E:
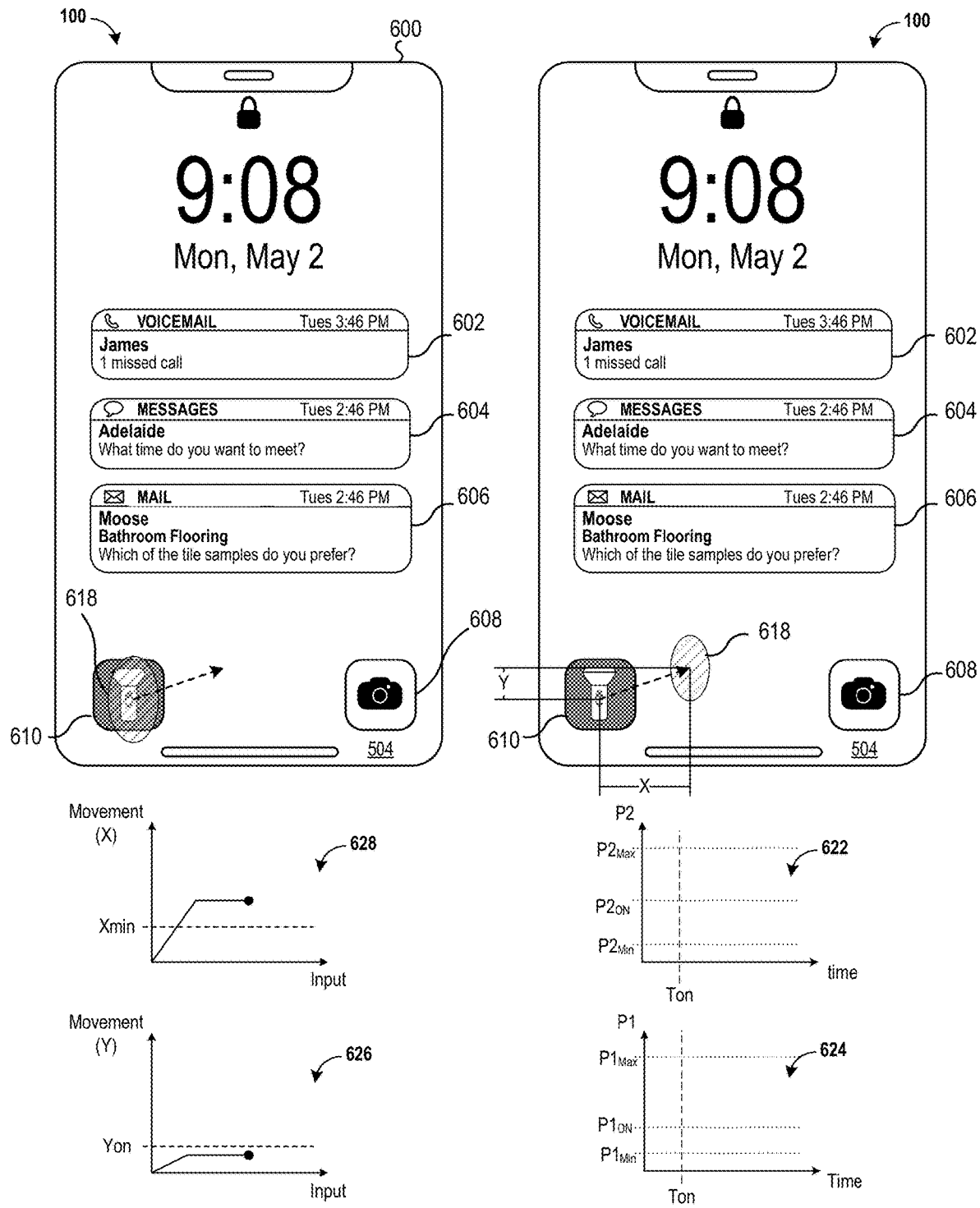

FIG. 6E illustrates the illumination element maintaining an off state in accordance with an input 618 corresponding to the flashlight icon 610 on wake screen 600 including movement X in a second direction. Contact graph 626 show that the input 618 includes movement in a first direction, Y, having a magnitude less than the threshold Yon. Contact graph 628 shows that the input 618 also includes movement in a second direction X having a magnitude greater than the minimum threshold $X_{min}$. In accordance with the input movement failing to meet the threshold $T_{on}$, the flashlight icon 610 maintains the off appearance of FIG. 6A and the illumination element 614 remains in an off state.

Figure 6F:
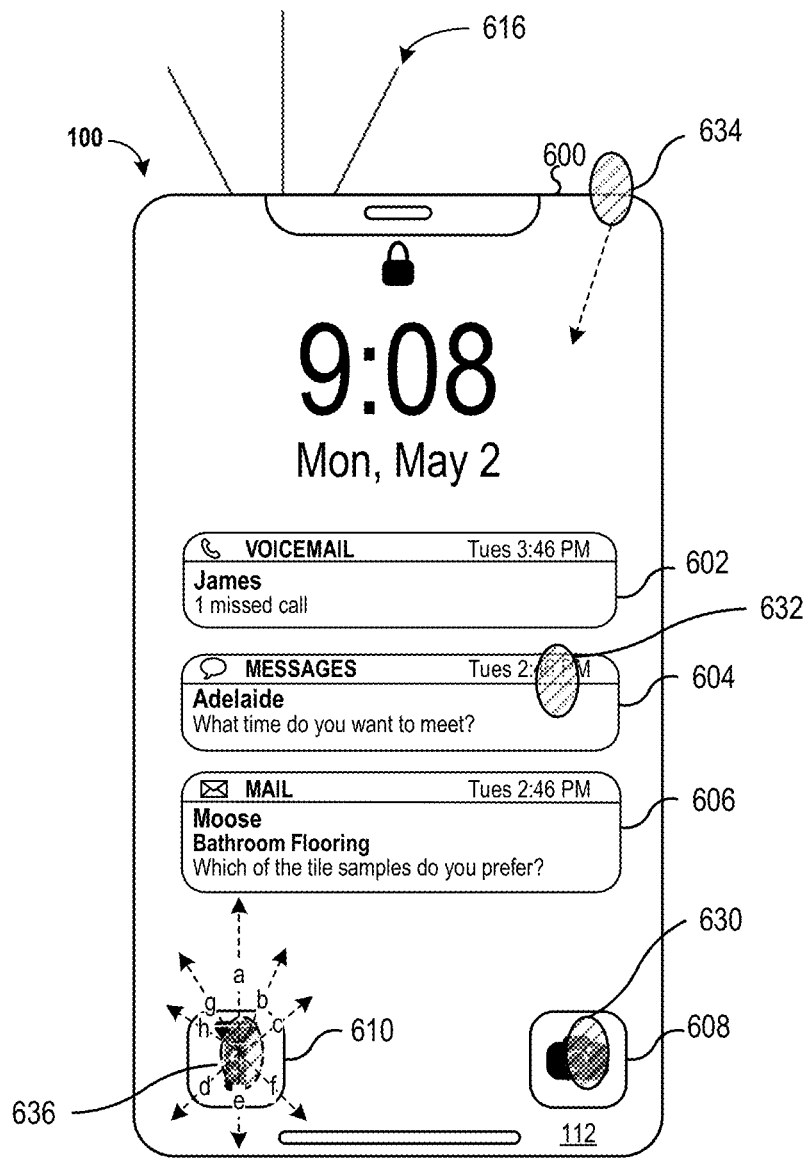
Figure 6G:
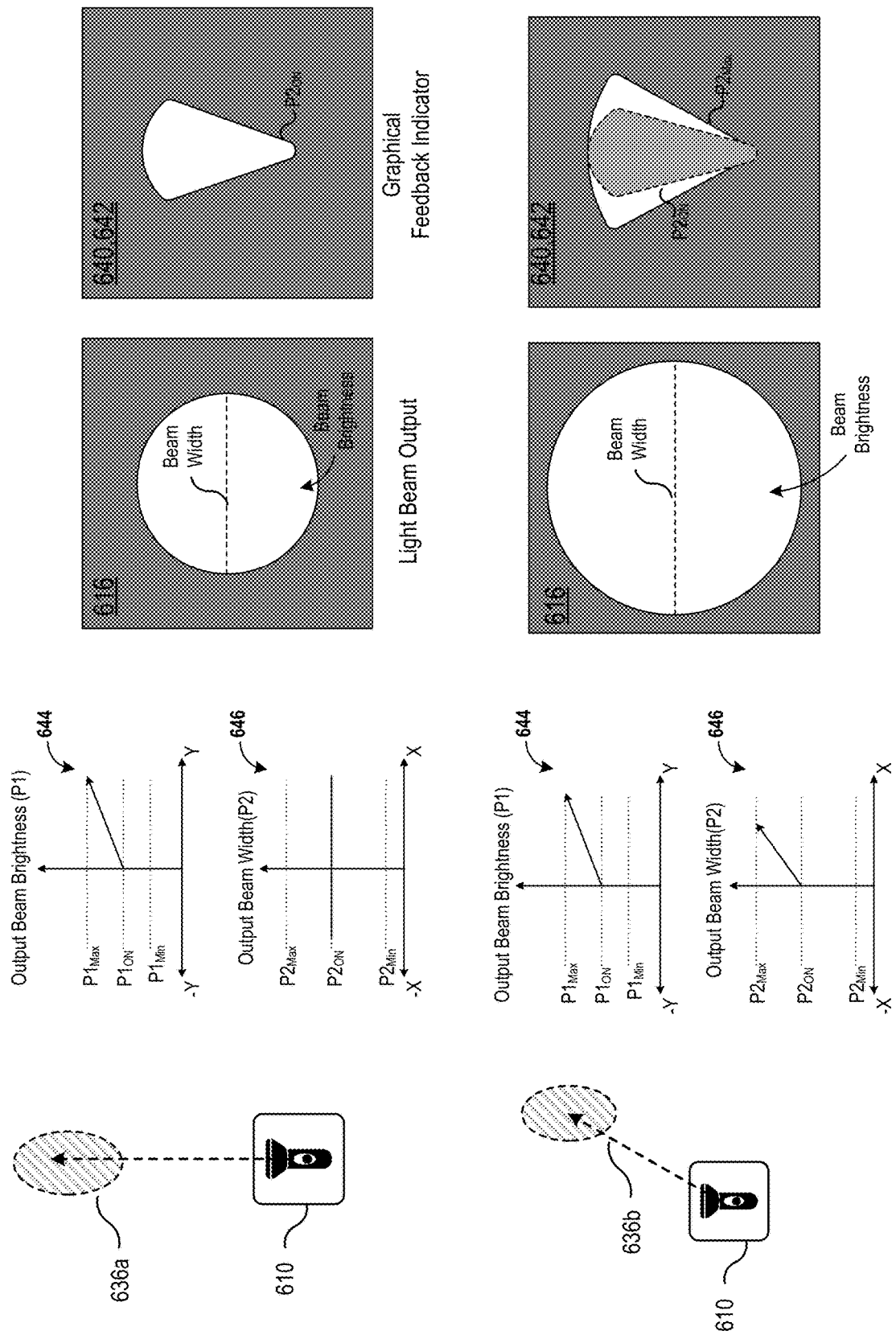
Figure 6G:
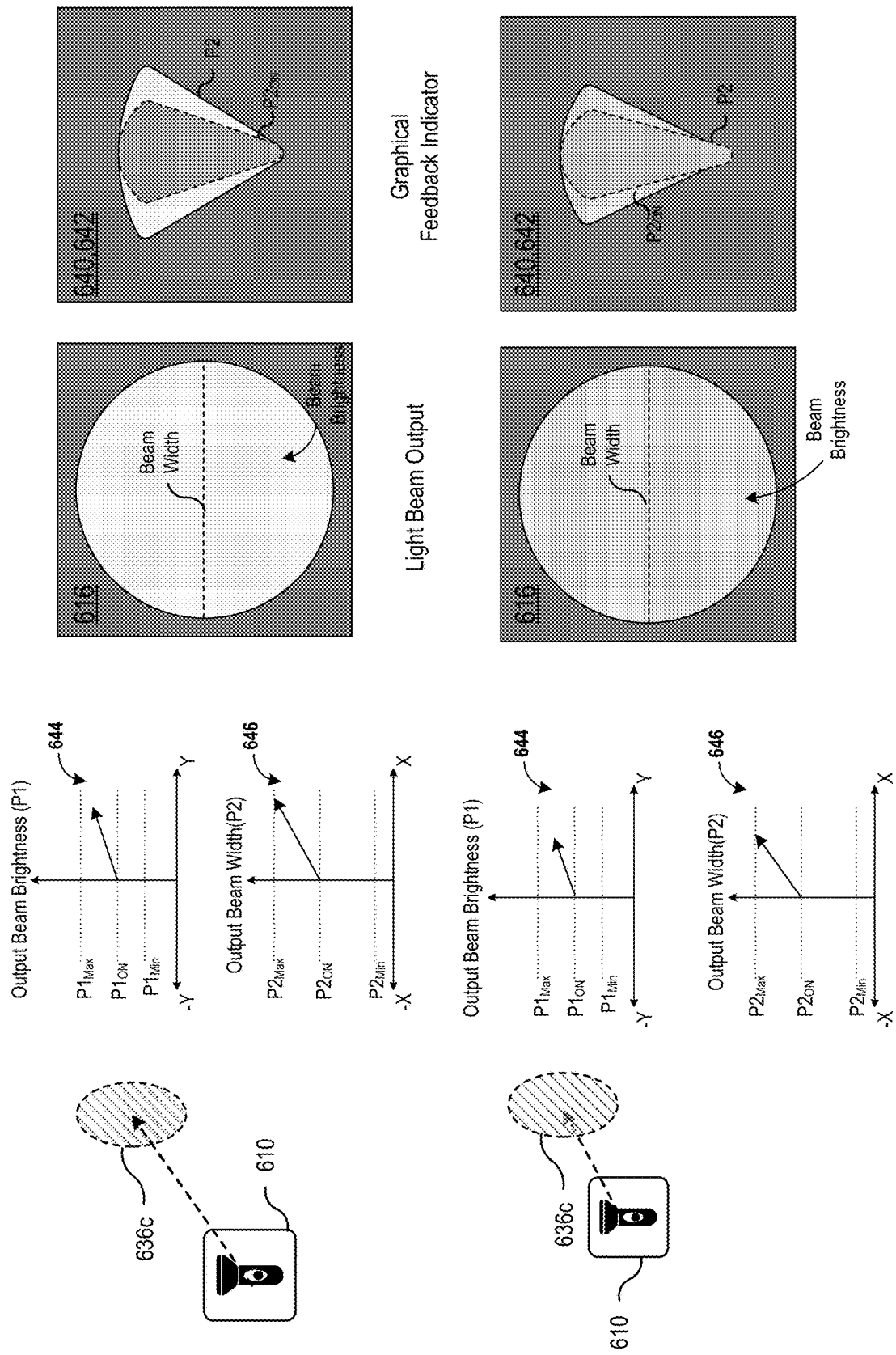
Figure 6G:
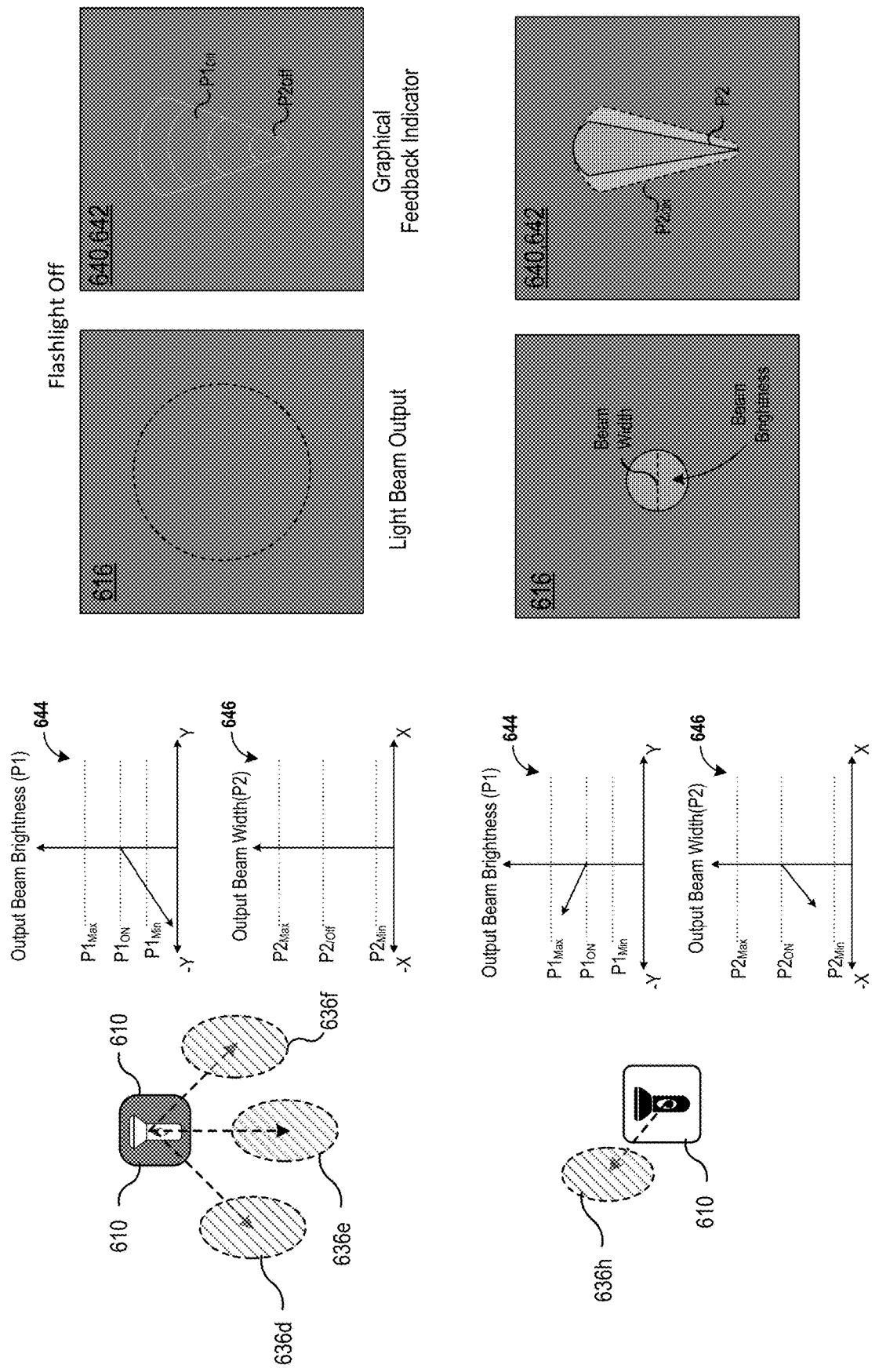

FIG. 6F illustrates the wake screen 600 with the illumination element in an on state and the flashlight icon 610 displayed with the "on" appearance of FIG. 6B with multiple possible inputs 630, 632, 634 and 636 at various locations on touch screen 112. For example, input 634 is a swipe from the upper right corner of the touch screen 112 which transitions wake screen 600 to control center interface 672 illustrated in FIG. 6J. Input 630 is a long tap and release which transitions the wake screen 600 to camera application interface 648 illustrated in FIG. 6H. Input 632 is tap that transitions the wake screen 600 to user confirmation user interface 662 illustrated in FIG. 6I. Inputs 636 are touches with movement in one of the directions indicated by the arrows. These inputs, specifically the movement associated therewith, affect (for example, changes the on/off state, the light beam width, and/or light beam brightness) the output of the illumination element in various ways as illustrated in FIGS. 6Ga-6Gb. The inputs 636 may include movement in a single direction (e.g., up, down, left, or right) or multiple directions (e.g., up and right, up and left, down and right, down and left). The inputs are optionally path independent or alternatively path dependent.

FIGS. 6Ga-6Gd illustrate various transitions of the output beam 616 and graphical feedback indicator (e.g., indicator 640 or 642 in FIG. 1) when the input 636 that corresponds to flashlight icon 610 while the illumination element 614 is in an on state moves in various directions. FIG. 6Ga illustrates the transition of the light beam output 616 from a default on brightness $P1_{on}$ to a maximum output brightness $P1_{max}$ while the output beam width is maintained at default on output $P2_{on}$ when the input 636a in FIG. 6F includes movement in a first direction (e.g., up) with no movement in a second direction (e.g., left or right). In some embodiments the feedback indictor 640 or 642 also transitions from a default on brightness $P1_{on}$ to a maximum output brightness $P1_{max}$ by changing the color of the indicator and maintaining the shape to correspond to a default on beam width output $P2_{on}$. As illustrated in graph 644 the output brightness transitions linearly with respect to the magnitude Y of the movement in the first direction. In some embodiments the output brightness transitions in a step-wise or continuous manner in accordance with magnitude of movement in the Y direction. In some embodiments the default outputs $P1_{on}$ and $P2_{on}$ correspond to previously set output values when the illumination element is transitioned to an off state. In some embodiments the default outputs $P1_{on}$ and $P2_{on}$ may be set by the user.

FIG. 6Ga further illustrates the transition of the light beam output 616 from a default on brightness $P1_{on}$ to a maximum output brightness $P1_{max}$ while the output beam width transitions from a default on output $P2_{on}$ to maximum beam width $P2_{max}$ when the input 636b in FIG. 6F includes movement in a first direction (e.g., up) and movement in a second direction (e.g., right). As illustrated in graph 644 the output brightness transitions linearly with respect to the magnitude Y of the movement in the first direction. As illustrated in graph 646 the output beam width transitions linearly with respect to the magnitude X of the movement in the second direction. In some embodiments the output brightness and/or beam width transitions in a step-wise or continuous manner in accordance with magnitude of movement in the Y and X directions, respectively. In some embodiments the feedback indictor 640 or 642 also transitions from a default on brightness $P1_{on}$ to a maximum output brightness $P1_{max}$ by changing the color of the indicator and transitions from a default on beam width to a maximum beam width $P2_{max}$ by changing the shape of the indicator from a first shape correspond to a default on beam width output $P2_{on}$ to a second shape corresponding to a maximum beam width $P2_{max}$. In some embodiments, the color of the indicator linearly changes in accordance with the magnitude of movement Y in the first direction and the shape of the indicator linearly changes in accordance with the magnitude of movement X in the second direction as discussed below with respect to FIG. 6M. In some embodiments the color and shape of the indicator change in a step-wise or continuous manner in accordance with the magnitude Y of movement in the first direction and the magnitude X of the movement in the second direction, respectively, as illustrated in FIG. 6N.

FIG. 6Gb illustrates the transition of the light beam output 616 from a default on brightness $P1_{on}$ to an increased output brightness P1 which is less than the maximum brightness while the output beam width transitions from a default on output $P2_{on}$ to an increased beam width P2 which is equal to or greater than the maximum beam width when the input 636c in FIG. 6F includes movement in a first direction (e.g., up) and movement in a second direction (e.g., right). In addition, FIG. 6GB illustrates the transition of the light beam output 616 from the default on brightness $P1_{on}$ to an increased output brightness P1 which is less than the maximum brightness while the output beam width transitions from a default on output $P2_{on}$ to an increased beam width P2 which is less than the maximum beam width. As illustrated in graph 644 the output brightness transitions linearly with respect to the magnitude Y of the movement in the first direction. As illustrated in graph 646 the output beam width transitions linearly with respect to the magnitude X of the movement in the second direction. In some embodiments the output brightness and/or beam width transitions in a step-wise or continuous manner in accordance with magnitude of movement in the Y and X directions, respectively. In some embodiments the feedback indictor 640 or 642 also transitions from a default on brightness P 1 on to a brightness P1 by changing the color of the indicator and transitions from a default on beam width to a beam width P2 by changing the shape of the indicator from a first shape correspond to a default on beam width output $P2_{on}$ to a second shape corresponding to an intermediate beam width P2.

FIG. 6Gc illustrates the transition of the light beam output 616 from a default on brightness $P1_{on}$ and default on beam width $P2_{on}$ to an off state when the input 636e-f in FIG. 6F includes movement in a third direction (e.g., down) regardless of any movement in the second direction (e.g., right) or a fourth direction (e.g., left). As illustrated in graph 644 the output brightness transitions to an off state based on the magnitude −Y of the movement in the third direction. As illustrated in graph 646 neither the magnitude X of the movement in the second direction (e.g., up) nor the magnitude −X of the movement in the fourth direction (e.g., left) have any effect on the transition to the off state. In some embodiments the feedback indictor 640 or 642 also transitions to an off state by changing the color to a darkened background with a default shape.

FIG. 6Gc further illustrates the transition of the light beam output 616 from a default on brightness P1$_{on}$ to an increased output brightness P1 which is less than the maximum output brightness while the output beam width transitions from a default on output P2$_{on}$ to a decreased beam width P2 when the input 636h in FIG. 6F includes movement in a first direction (e.g., up) and movement in a fourth direction (e.g., left). As illustrated in graph 644 the output brightness transitions linearly with respect to the magnitude Y of the movement in the first direction. As illustrated in graph 646 the output beam width transitions linearly with respect to the magnitude –X of the movement in the fourth direction (e.g., left). In some embodiments the output brightness and/or beam width transitions in a step-wise or continuous manner in accordance with magnitude of movement in the Y and X directions, respectively. In some embodiments the feedback indictor 640 or 642 also transitions from a default on brightness P 1 on to a brightness P1 by changing the color of the indicator and transitions from a default on beam width to a beam width P2 by changing the shape of the indicator from a first shape correspond to a default on beam width output P2$_{on}$ to a second shape corresponding to an intermediate beam width P2.

FIG. 6Gd illustrates the transition of the light beam output 616 from a default on brightness P1$_{on}$ to an increased output brightness P1 and P1$_{max}$ while the output beam width transitions from a default on output P2$_{on}$ to a decreased beam width P2$_{min}$ when the input 636g-h in FIG. 6F includes movement in a first direction (e.g., up) and movement in a fourth direction (e.g., left). As illustrated in graph 644 the output brightness transitions linearly with respect to the magnitude Y of the movement in the first direction. As illustrated in graph 646 the output beam width transitions linearly with respect to the magnitude –X of the movement in the fourth direction (e.g., left). In some embodiments the output brightness and/or beam width transitions in a step-wise or continuous manner in accordance with magnitude of movement in the Y and –X directions, respectively In some embodiments the feedback indictor 640 or 642 also transitions from a default on brightness P1$_{on}$ to a brightness P1 or P1$_{max}$ by changing the color of the indicator and transitions from a default on beam width to a minimum beam width P2$_{min}$ by changing the shape of the indicator from a first shape correspond to a default on beam width output P2$_{on}$ to a second shape corresponding to the minimum beam width P2$_{min}$.

Figure 6H:
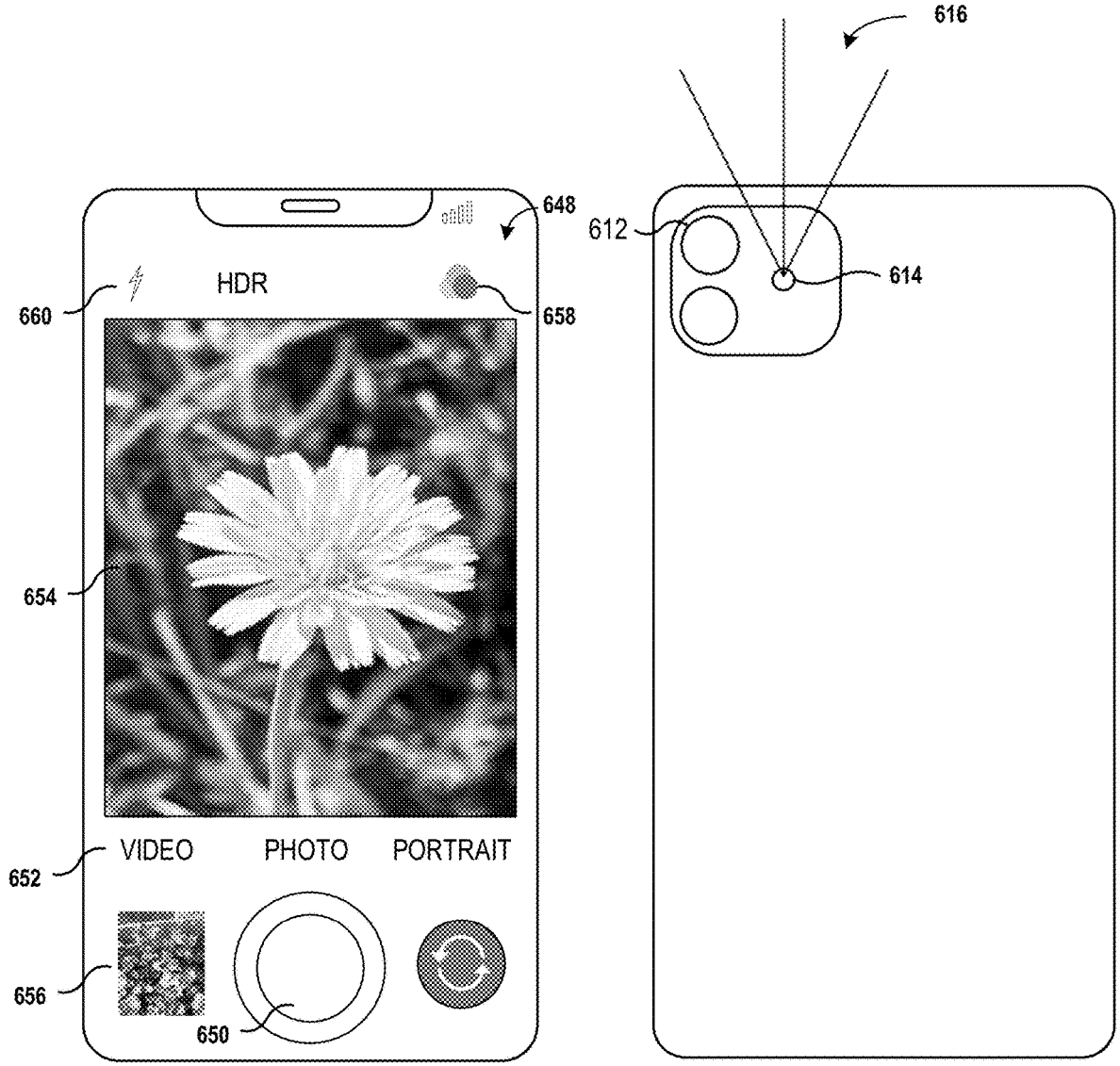

FIG. 6H illustrates another transition of wake screen 600 from FIG. 6F in accordance with input contact 630 detected at a location on the touch screen 112 corresponding to camera icon 608. In accordance with detection of a lift off of the input contact 630, camera application user interface 648 is displayed (e.g., the function associated with camera icon 608, displaying the camera application user interface, is performed). Camera interface 648 includes capture affordance 650 (e.g., for capturing media such as images or video in response to a selection input), mode indicator 652 (e.g., for selecting a current media capture mode of the camera interface in response to a selection input), live view area 654 (e.g., displaying a preview of media to be captured), image well 656 (e.g., display a preview image representing a most-recently captured image or video), filter icon 658 (e.g., for changing a camera filter in response to a selection input), and flash mode indicator 660 (e.g., for toggling an on/off state of a flash operation in response to a selection input and indicating whether illumination element 614 is to be used during image capture). In some embodiments, the same illumination element 614 is used for both the camera and flashlight applications.

Figure 6I:
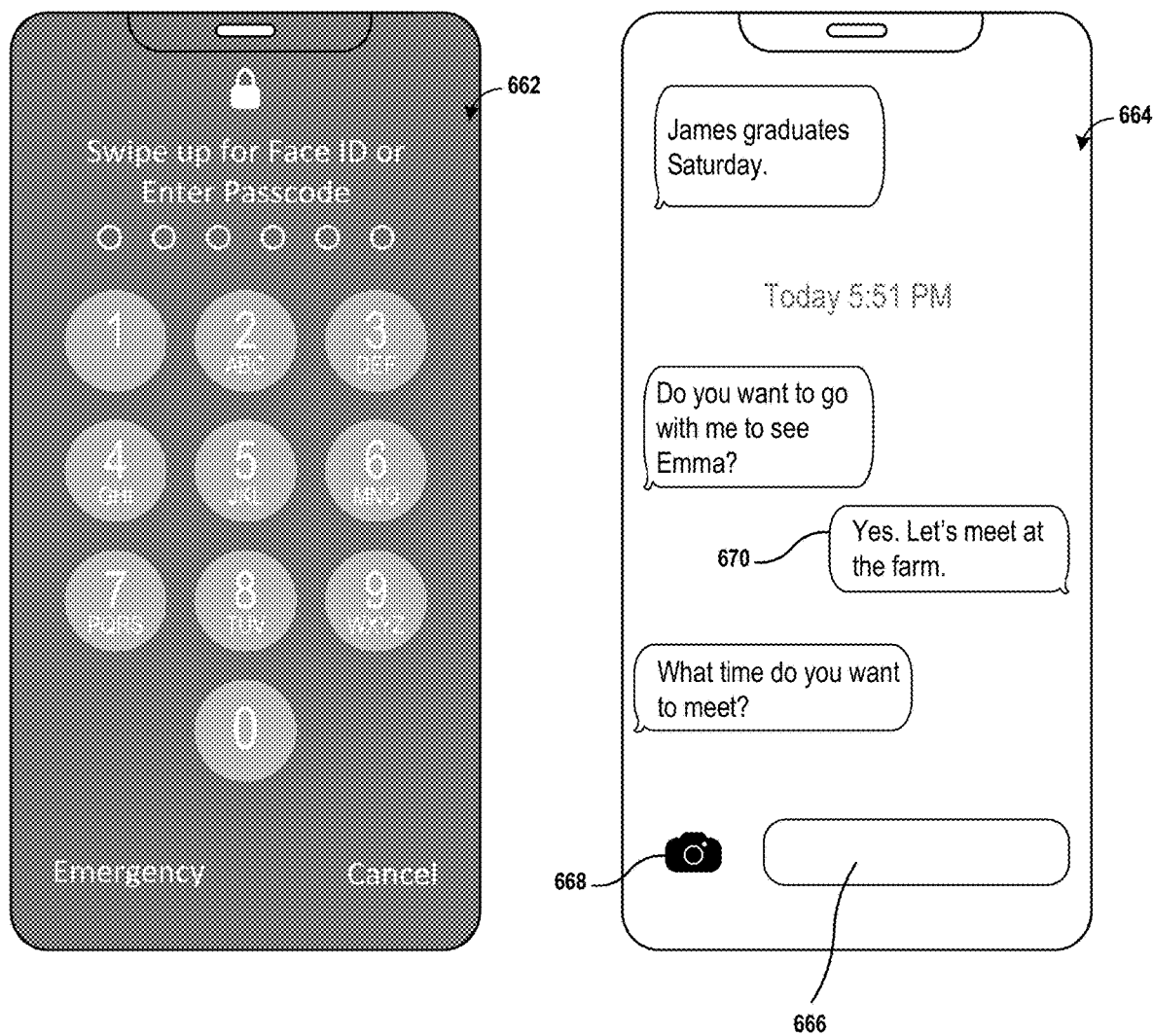

FIG. 6I illustrates another transition of wake screen 600 from FIG. 6F in accordance with input contact 632 detected at a location on the touch screen 112 corresponding to message notification 604. Message notification 604 notifies a user of device 100 of a received text message and includes a preview of the received message. In accordance with detection of the input 632, a user confirmation process is initiated and a user confirmation user interface 662 is displayed. In some embodiments the initiated user conformation process is a biometric authentication process such as a face detection process or a fingerprint detection process which does not require the user confirmation interface 662. Upon completion of the user confirmation process, messaging application user interface 664 is displayed. Messaging application interface 664 includes input affordance 666 (e.g., for providing a response to the received message), and camera icon 668 (e.g., for capture an image to send in the response) and message elements 670 which display previous messages received from and/or sent to the contact (e.g., number or user).

Figure 6J:
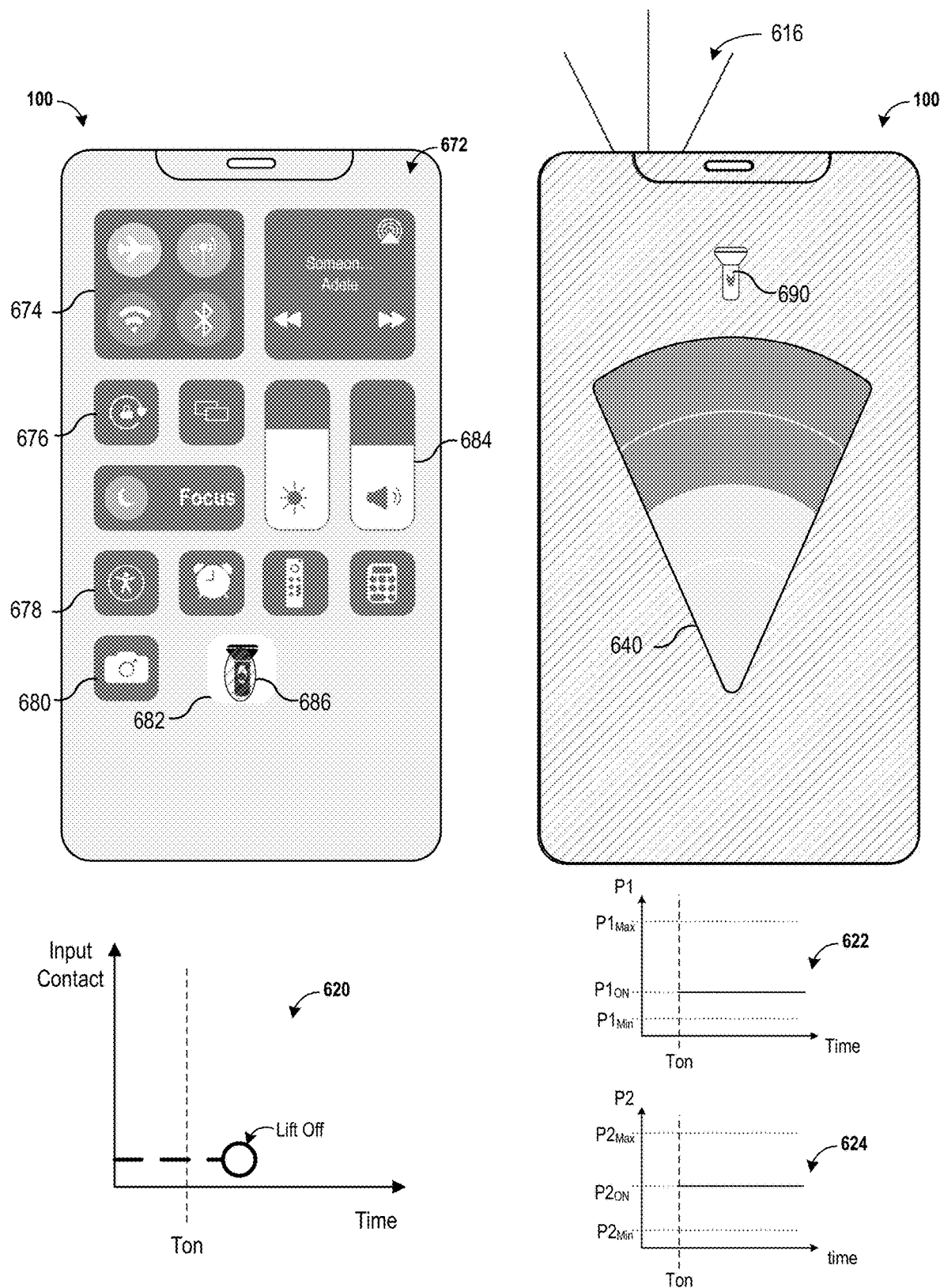

FIG. 6J illustrates another transition of wake screen 600 from FIG. 6F in accordance with a swipe down input 634 detected from at a location beginning at the upper right of the touch screen 112. In accordance with detection of the swipe down input 634, control center user interface 672 is displayed. Control center user interface 672 includes setting affordance 674 (e.g., displaying a current state of various device setting, including airplane mode, WiFi mode, Bluetooth, cellular data), orientation lock affordance 676 (e.g., for toggling the device orientation lock on and off), accessibility affordance 678 (e.g., for enabling accessibility shortcuts), camera icon 668 (e.g., for capture an image or video), volume affordance 684 (e.g., for increasing or decreasing an output volume of the device) and flashlight icon 682. While displaying the control center interface 672, detection of an input contact 686 which is maintained for a predetermined threshold I$_{on}$ as shown in graph 620, displays flashlight indicator 640. If the flashlight is in an off state when the input 686 is detected the indicator 640 is display with a predefined shape and color indicating the flashlight is in an off state as shown in FIG. 6L. If the flashlight is in an on state when the input 686 is detected the indicator 640 is displayed with a predefined shape indicating a predefined beam width on output P2on shown in graph 624 and a predefined color indicating a predefined brightness on output P1on shown in graph 622 and the button 688 of the icon 690 is transitioned to an up most position.

Figure 6K:
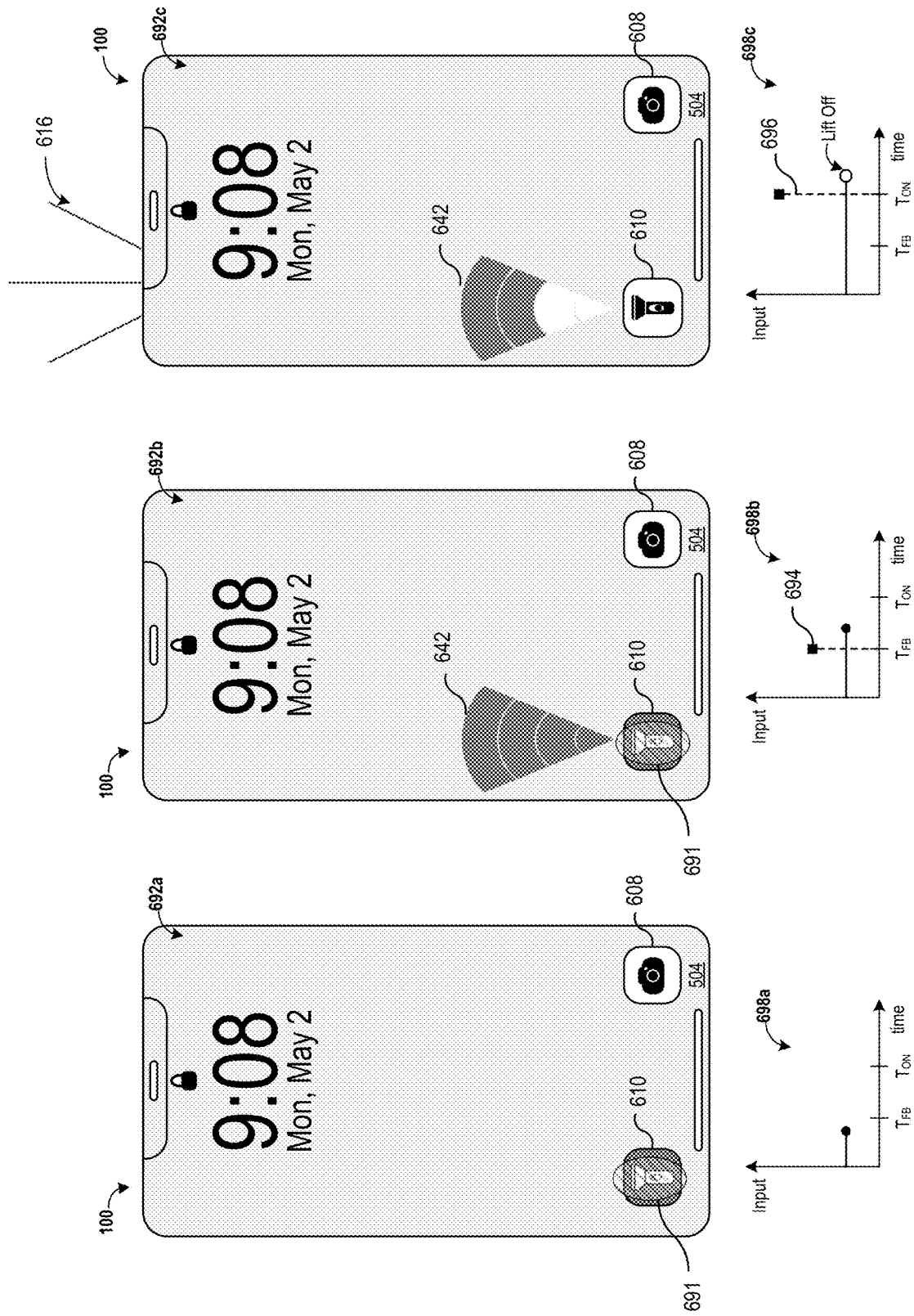
Figure 6L:
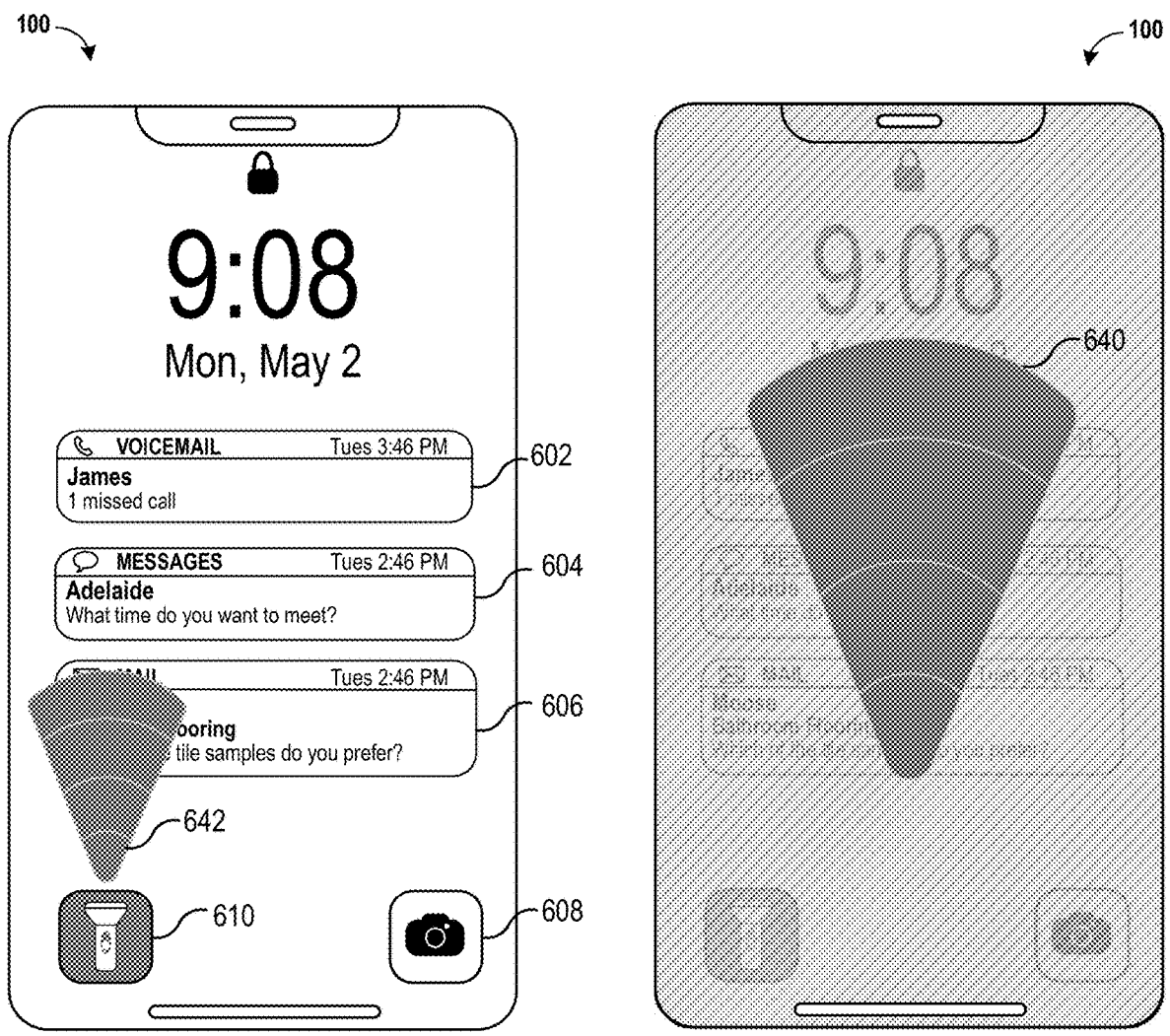

FIG. 6K illustrates the transition of wake screen 692a-696c when the flashlight changes from an off state to an on state with a visual feedback indicator and optionally with haptic feedback. The input contact 691 is initiated in graph 698a, is maintained for a first threshold T$_{FB}$ in graph 698b and then lift off is detected after a second threshold T$_{on}$ in graph 698c. When input contact satisfies the first threshold T$_{FB}$, the feedback indicator 642 is displayed with a shape and color corresponding to an off state. In addition, as shown in graph 698b a first haptic feedback 694 is provided. When the input contact satisfies the second threshold Ton, the color and shape of the feedback indicator are changes to indicate the on state of the illumination element 614. In addition, as shown in graph 698c a second haptic feedback 696 more prominent than (e.g., with a greater amplitude and/or duration than) the first haptic feedback 694 is provided.

FIG. 6L illustrate the feedback indictor 642 displayed as an overlay to wake screen 600 or as a separate interface 640. In some embodiments when the illumination element 614 is activated using the flashlight icon 610 on the wake screen 600, the graphical feedback indicator is displayed an overlay 642 which is continuously displayed until lift off of the activating input is detected. In some embodiments when the illumination element 614 is activated using the flashlight icon 682 on control center interface 672 the graphical feedback indicator is displayed as a separate interface which is continuously displayed until dismissed (e.g., with a tap on screen outside of the feedback indicator. The various alterations/changes to the feedback indicator illustrated in FIGS. 6Ga-6Gd, 6M, and 6N are applicable to feedback indicator whether displayed as an overlay or a separate interface.

Figure 6M:
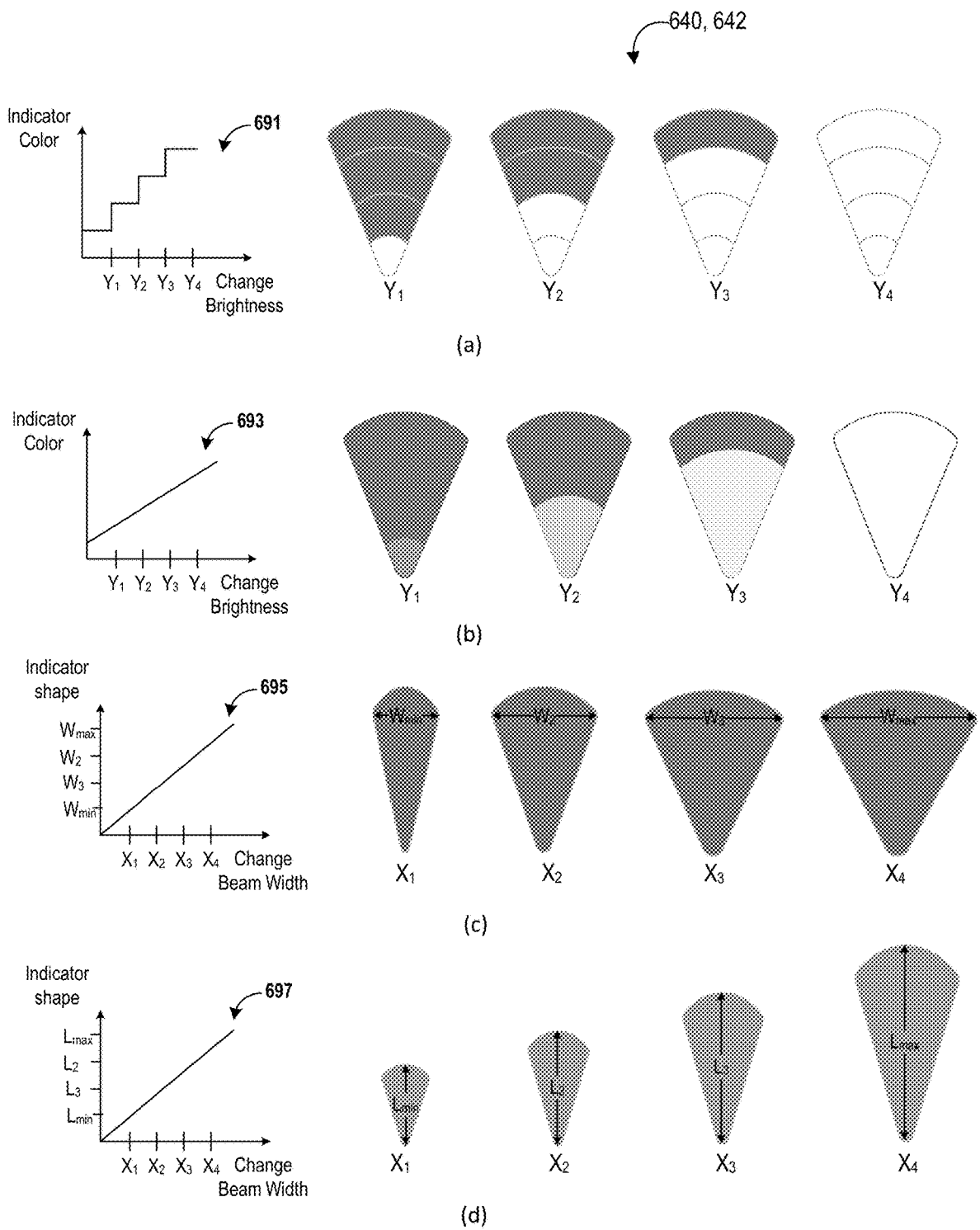

FIG. 6M illustrates the shape or color of the feedback indicator 640 or 642 shown in FIG. 6L changes in accordance with the magnitude of the change output of the illumination device 614. In some embodiments, as illustrated in section (a) of FIG. 6M, the color of the feedback indicator 640 or 642 changes in accordance with the magnitude Y of the change of the brightness of the light beam output from the illumination device 614. For example, the feedback indicator includes predefined sections and the color of the respective sections change to indicate the current brightness of the output element. For example, a change in brightness from a first level Y1 to a maximum level Y4 transitions the feedback indicator from a single section being highlighted to all four sections being highlights as illustrated in section (a). In some embodiments the highlight color may gradually increase to brightness or prominence to reflect the change in output brightness as illustrated in section (b). In some embodiments the shape (e.g., length or width) of the feedback indicator 640 or 642 changes in accordance with the magnitude of change in the beam width output from the illumination device 614 as illustrated in sections (c) and (d) of FIG. 6M, respectively. In some embodiment the color changes in a step-wise or continuous manner in accordance with changes to the beam brightness as shown in graph 691. In some embodiments the color changes linearly in accordance with changes in brightness as shown in graph 693. In some embodiment the shape width of the feedback indictor 640 or 642 linearly changes in accordance with changes in the width of the beam output from the illumination element 614 as shown in graph 695. In some embodiments the shape length of the feedback indicator linearly changes in accordance with changes in the width of the beam output from the illumination element 614 as shown in graph 697. In FIG. 6M the feedback indicator indicates a single output parameter (e.g., brightness or beam width) of the illumination element 614, however, the changes in shape and color is combined in some embodiments to indicate multiple output parameters as illustrated in FIG. 6N.

FIG. 6N illustrates feedback indicator 640 or 642 indicating changes in both the brightness and beam width of the light beam output from the illumination element 614. As shown in graphs 681 and 683 both the indictor shape and color change in a step-wise or continuous manner in accordance with changes in the output properties of the illumination element. As illustrated in graph 681 as the magnitude of the beam width changes from $X_1$ through $X_4$, the shape width of the indicator transitions between $L_{min}$ to $L_{max}$. As illustrated in graph 683 as the magnitude of the beam brightness changes from $Y_1$ through $Y_4$, the color of the indicator transitions between $C_{min}$ to $C_{max}$. In some embodiments, the shape and color linearly change in accordance with the changes in the output properties. The matrix of indicator changes shown in FIG. 6N illustrates various changes in color and shape in accordance with the changes in beam width X and brightness Y. Specifically, each column represents a corresponding feedback indicator shape width and each row represents a corresponding feedback indicator color such that the feedback indicator illustrated in each intersection represents that corresponding shape and color for the output width and brightness $X_1$, $Y_1$. For example, the intersection for the first column $X_1$ and first row $Y_1$ corresponds to minimum beam width $W_{min}$ and minimum brightness $C_{min}$ and the intersection of the fourth column $X_4$ and fourth row $Y_4$ corresponds to a maximum beam width $W_{max}$ and maximum brightness $C_{max}$. when the beam width changes from a first value $X_1$ to a second value $X_2$, the width of feedback indicator shape changes from a first width $W_{min}$ to a larger width $W_2$. Accordingly, movement between columns (e.g., $X_1$ to $X_3$ or $X_4$ to $X_2$) represents changes (e.g., increases or decreases) in the output beam width and movement between rows (e.g., $Y_2$ to $Y_4$ or $Y_4$ to $Y_3$) represents changes (e.g., increases or decreases) in brightness. Diagonal movement (e.g., movement between both a row and column) represents changes (e.g., increases or decreases) in both beam width and brightness. For example, a transition from $X_3$, $Y_2$ to $X_2$, $Y_4$ corresponds to decrease in beam width from $W_3$ to $W_2$ concurrently with an increase in brightness from $Y_2$ to $Y_4$, accordingly, the feedback indicator would transition by decreasing the shape width from $W_3$ to $W_2$ and increasing the color from $C_2$ to $C_{max}$.

FIG. 7 is a flow diagram illustrating a method 700 for changing output properties of an illumination element (e.g., 614 in FIG. 6A) using an electronic device (e.g., in accordance with some embodiments. Method 700 is performed at an electronic device (e.g., 100, 300, 500 in FIGS. 2, 4A, and 5A) that includes a display device, one or more input device (e.g., a touch-sensitive surface) and an illumination element (e.g., 614 in FIG. 6A). In some embodiments, the display is a touch-screen display and the touch-sensitive surface is on or integrated with the display. In some embodiments, the display is separate from the touch-sensitive surface. Some operations in method 700 are, optionally, combined, the orders of some operations are, optionally, changed, and some operations are, optionally, omitted.

As described below, method 700 provides an intuitive way for changing output properties of an illumination element (e.g., a flashlight) from a wake screen. The method reduces the number, extent, and/or nature of the inputs from a user when activating a flashlight feature from a wake screen, thereby creating a more efficient human-machine interface. For battery-operated computing devices, enabling a user to change output properties of an illumination element (e.g., flashlight feature) faster and more efficiently conserves power and increases the time between battery charges.

Method 700, which is performed at (and thus performed by) an electronic device (e.g., a smart phone, or tablet) with a display device, one or more input elements, and an illumination element (e.g., an LED or other light source that can be used as a flashlight or camera flash), includes displaying (704), via the display device, a user interface (e.g., wake screen 600 in FIG. 6A or control center user interface 672 in FIG. 6J) including a first user interface element (e.g., flashlight icon 610 in FIG. 6A or 682 in FIG. 6J), the first user interface element being associated with the illumination element (e.g., 614 in FIG. 6A). In some embodiments, the electronic device is multi-function device and a flashlight affordance (e.g., 610 in FIG. 6A) is displayed along one or more other affordances (e.g., 602, 604, 606, and/or 608 in FIG. 6A) for performing associated operations (e.g., capturing visual and/or auditory media, answering a call, and/or receiving notifications as shown in FIG. 6A).

Method 700 further includes detecting (706), via the one or more input elements (e.g., on the touch-sensitive surface 112 in FIG. 6A), a first input (e.g., long press) at a location corresponding to the first user interface element (e.g., 610 in FIG. 6C), and in response to detecting the first input (708), in accordance with a determination that the first input meets first criteria (e.g., $T_{on}$ in graph 620 of FIG. 6C), changing a beam width of a light beam emitted by the illumination element (616 in FIGS. 6Ga-6Gd) from a first beam width to a second beam width, wherein the second beam width is different from the first beam width. Examples of changes in brightness P1 and/or beam width P2 in accordance with detection of various movement in input 636 in FIG. 6F are discussed with reference to FIGS. 6F-6Gd. In some embodiments, the beam width is measured in units of length at a specified plane perpendicular to the beam axis. In some embodiments, the beam width is measured as an angular width, which is the angle subtended by the beam at the source of the illumination element.

Enabling the adjustment of a beam width of a flashlight based on an input directed to a user interface element provides easy access to a beam width adjustment feature and the beam width of the flashlight to be adjusted with fewer inputs, thereby creating a more efficient human-machine interface.

In some embodiments, method 700 further includes receiving one or more second inputs (e.g., 630 in FIG. 6F) at the electronic device corresponding to a request to capture visual media (e.g., one or more photos and/or one or more videos) using one or more image sensors (e.g., 612 in FIG. 6A) of the electronic device, and in response to receiving the one or more second inputs, capturing visual media (e.g., 654 in FIG. 6H) using the one or more image sensors and while capturing the visual media using the one or more image sensors, emitting light (e.g., 616 in FIG. 6H) with the illumination element (e.g., 614 in FIG. 6H) to illuminate a subject of the visual media (e.g., using the illumination element as a camera flash). Enabling capturing of visual media based on one or more inputs directed to a user interface element provides each access to the visual media capture features and visual media to be captured with fewer inputs, thereby creating a more efficient human-machine interface.

In some embodiments, method 700 further includes, prior to detecting the first input (e.g., 618 in FIG. 6C), the illumination element (e.g., 614 in FIG. 6A) is not emitting light, and in response to detecting at least a portion of the first input that meets second criteria (e.g., in response to detecting the contact maintained on the touch-sensitive surface for at least a threshold amount of time $T_{on}$ in graph 620 of FIG. 6C), starting to emit light (e.g., 616 in view FIG. 6C) via the illumination element. Allowing the illumination element to be turned on via the same input reduces a number of inputs and time needed to perform an operation at the electronic device making operation of the electronic device faster and more efficient, which reduces accidental inputs and conserves power and, for battery powered devices, increases the time between battery charges.

In some embodiments, changing the width of the light beam emitted by the illumination element includes changing the width of the light beam through a plurality of values (e.g., $P2_{min}$-$P2_{max}$ in FIGS. 6Ga-6Gd and $L_{min}$, $L_2$, $L_3$, and $L_{max}$ in FIG. 6N) based on movement ($X_1$-$X_4$ in FIG. 6N) of the detected input (e.g., a magnitude of change of the width of the light beam is based on a magnitude of movement of the input and/or a direction of change of the width of the light beam is based on a direction of movement of the input). Changing the width of the light beam through a plurality of values based on movement of a single input reduces a number of inputs needed to change an output property of the illumination element making operation of the electronic device faster and more efficient, which reduces accidental inputs and conserves power and, for battery powered devices, increases the time between battery charges.

In some embodiments, method 700 further includes in response to detecting (708) the first input, changing a brightness (e.g., $P1_{min}$-$P1_{max}$ in FIGS. 6Ga-6Gd and $C_{min}$, $C_2$, $C_3$, and $C_{max}$ in FIG. 6N) of the light beam emitted by the illumination element (e.g., changing the brightness of the light emitted by the illumination element from a first non-zero brightness to a second non-zero brightness). Changing the brightness of the light beam in addition to the beam width based on a single input reduces a number of inputs needed to alter the light properties of the illumination element making operation of the electronic device faster and more efficient, which conserves power and, for battery powered devices, increases the time between battery charges.

In some embodiments, the first input includes movement and the method 700 includes, in response to detecting the movement: in accordance with a determination that the movement in the first input includes movement in a first direction (e.g., X in FIG. 6Ga-6Gd), changing the beam width (e.g., P2 in FIG. 6Ga-6Gd) of the light beam emitted by the illumination element (e.g., 614 in FIG. 6A); and in accordance with a determination that the movement in the first input includes movement in a second direction (e.g., Y in FIG. 6Ga-6Gd) that is different from the first direction changing a brightness (e.g., P1 in FIG. 6Ga-6Gd) of the light beam emitted by the illumination element. Changing the beam width of the light beam based on movement in a first direction and changing a brightness of the light beam in accordance with the first include including movement in a second directions reduces a number of inputs needed to change multiple light properties of the illumination element making operation of the electronic device faster and more efficient, which conserves power and, for battery powered devices, increases the time between battery charges.

In some embodiments, the first direction corresponds to movement along a first axis (e.g., X in graph 646 of FIG. 6Ga-6Gd). Changing the beam width based on movement along a first axis clarifies the movement needed to alter an output property of the illumination element of the electronic device thereby reducing accidental inputs making operation of the electronic device faster and more efficient, which conserves power and, for battery powered devices, increases the time between battery charges.

In some embodiments, the second direction corresponds to movement along a second axis that is different from the first axis (e.g., Y in graph 644 of FIG. 6Ga-6Gd). Separating the direction of movement needed to change different output properties of the illumination element to different axes clarifies the movement needed to alter the respective output property of the illumination element thereby reducing accidental inputs making operation of the electronic device faster and more efficient, which conserves power and, for battery powered devices, increases the time between battery charges.

In some embodiments, method 700 further includes in accordance with a determination that the detected movement includes movement in the first direction (e.g., X in FIG. 6Ga-6Gd) and the second direction (e.g., Y in FIG. 6Ga-6Gd) altering (e.g., concurrently altering) both the brightness (e.g., P1 in FIG. 6Ga-6Gd) of the light beam and the beam width (e.g., P2 in FIG. 6Ga-6Gd) of the light beam based on the detected movement. Changing multiple output properties of the illumination element based on the same input, e.g., when the input includes movement in two directions, reduces a number of inputs needed to alter multiple output properties of the illumination element of the electronic device making operation of the electronic device faster and more efficient, which conserves power and, for battery powered devices, increases the time between battery charges.

In some embodiments, in response to detecting the first input (708), the method 700 further includes: displaying a graphical feedback indicator (e.g., beam indicator 640 or 642 in FIGS. 6Ga-6Gd and 6K-6M) that graphically indicates a direction and/or magnitude of changes to the width of the light beam. Displaying a graphical feedback indicator that graphically indicates a direction and/or magnitude of changes to the width of the light beam provides the user visual confirmation that the device is responding to the user's touch input, reducing accidental inputs to the electronic device, which in turn makes use of the electronic device more efficient in terms of both time and battery usage.

In some embodiments, method 700 further includes while continuing to detect the first input, changing a size and/or shape (e.g., W or L in FIG. 6M) of the graphical feedback indicator (e.g., 640 or 642 in FIG. 6M) based on the first input (e.g., 636 in FIG. 6F); and in response to detecting an end of the first input, in accordance with a determination that a size and/or shape of the graphical feedback indicator is a size and/or shape that is beyond a threshold size and/or shape (e.g., W or L in FIG. 6M) that is associated with a respective threshold (e.g., a maximum $W_{max}$ or $L_{max}$ in FIG. 6M or minimum Walla or $L_{min}$ in FIG. 6M) value for the beam width of the light beam (e.g., a maximum beam width $P2_{max}$, and/or a minimum beam width $P2_{min}$ in FIGS. 6Ga-6Gd), changing a size and/or shape of the graphical feedback indicator to a size and/or shape that is associated with the respective threshold value from a respective size and/or respective shape of the graphical feedback indicator when the end of the input was detected.

In some embodiments, in response to detecting an end of the input, in accordance with a determination that a size and/or shape of the graphical feedback indicator is a size and/or shape (e.g., W or L in FIG. 6M) that is not beyond the threshold size and/or shape that is associated with a respective threshold (e.g., a maximum $W_{max}$ or $L_{max}$ in FIG. 6M or minimum $W_{min}$ or $L_{min}$ in FIG. 6M) value for a parameter (e.g., brightness or beam width) the light beam (e.g., a maximum brightness, a minimum brightness, a maximum beam width, and/or a minimum beam width), maintaining a size and/or shape (e.g., W or L in FIG. 6M) of the graphical feedback indicator to a size and/or shape that is associated with the respective threshold value (e.g., $W_2/W_3$ or $L_2/L_3$ in FIG. 6M) at the respective size and/or respective shape of the graphical feedback indicator when the end of the input was detected.

Changing a size and/or shape of the graphical feedback indicator to a size and/or shape that is associated with the respective threshold value from a respective size and/or respective shape of the graphical feedback indicator when the end of the input is detected provides a user with visual confirmation that the device is responding to the user's touch input, making operation of the electronic device faster and more efficient, which conserves power and, for battery powered devices, increases the time between battery charges.

In some embodiments, a width (e.g., W in FIG. 6M) of the graphical feedback indicator (e.g., 640, 642 in FIG. 6M) is narrower when the beam width (e.g., X in FIG. 6M) of the light beam is narrower, and a width (e.g., W in FIG. 6M) of the graphical feedback indicator is wider when the beam width (e.g., X in FIG. 6M) of the light beam is wider (e.g., graph 695 in FIG. 6M). In some embodiments, the width of the graphical feedback indicator narrows and widens dynamically in accordance with the narrowing and widening of the beam width output by the illumination device. Narrowing and widening the graphical feedback indicator when the beam with of the light beam is narrower or wider provides the user with a visual confirmation of the output property of the illumination device, making operation of the electronic device faster and more efficient, which conserves power and, for battery powered devices, increases the time between battery charges.

In some embodiments, a length (e.g., L in FIG. 6M) of the graphical feedback indicator is longer when the width (e.g., X in FIG. 6M) of the light beam is narrower, and a length (e.g., L in FIG. 6M) of the graphical feedback indicator is shorter when the width (e.g., X in FIG. 6M) of the light beam is wider (e.g., graph 697 in FIG. 6M). Lengthening and shortening the graphical feedback indicator when the beam width of the light beam is narrower or wider provides the user with a visual confirmation of the output property of the illumination device, making operation of the electronic device faster and more efficient, which conserves power and, for battery powered devices, increases the time between battery charges.

In some embodiments, method 700 further includes in response to detecting the first input: displaying a graphical feedback indicator (e.g., beam indicator 640,642 in FIG. 6M) that graphically indicates a direction and/or magnitude of changes to a brightness of the light beam (e.g., graphs 691 and 693 in FIG. 6M). Displaying a graphical feedback indicator that graphically indicates a direction and/or magnitude of changes to the brightness of the light beam provides the user visual confirmation that the device is responding to the user's touch input, thereby reducing accidental inputs to the electronic device, which in turn makes use of the electronic device more efficient in terms of both time and battery usage.

In some embodiments, method 700 further includes while continuing to detect the first input (e.g., 636 in FIG. 6F), changing a size and/or shape of the graphical feedback indicator (e.g., 640,642 in FIG. 6M) based on the first input; and in response to detecting an end of the first input, in accordance with a determination that a size and/or shape (e.g., color in graphs 691 and 693 in FIG. 6M) of the graphical feedback indicator is a size and/or shape that is beyond a threshold size and/or shape that is associated with a respective threshold (e.g., a maximum or minimum) value for the brightness of the light beam (e.g., a maximum brightness, and/or a minimum brightness), changing a size and/or shape of the graphical feedback indicator to a size and/or shape that is associated with the respective threshold value from a respective size and/or respective shape of the graphical feedback indicator when the end of the input was detected.

In some embodiments, this rubber banding effect occurs for a change in brightness without occurring for a change in beam width (e.g., where the brightness has reached a maximum or minimum threshold but the beam width has not). In some embodiments, this rubber banding effect occurs for a change in beam width without occurring for a change in brightness (e.g., where the beam width has reached a maximum or minimum threshold but the brightness has not). In some embodiments, this rubber banding effect occurs for both a change in beam width and a change in brightness (e.g., where both the brightness and the beam width have reached respective a maximum or minimum thresholds). Changing a size and/or shape of the graphical feedback indicator to a size and/or shape that is associated with the respective threshold value from a respective size and/or respective shape of the graphical feedback indicator when the end of the input is detected provides a user with visual confirmation that the device is responding to the user's touch input, making operation of the electronic device faster and more efficient, which conserves power and, for battery powered devices, increases the time between battery charges.

In some embodiments the graphical feedback indicator (e.g., beam indicator 640,642 in FIG. 6N) also graphically indicates a direction and/or magnitude of changes to the brightness of the light beam in addition to indicating the direction and/or magnitude of changes to the width of the light beam. Graphically indicating a direction and/or magnitude of changes to both the brightness and beam width of the light beam with the graphical feedback indicator provides the user with a visual confirmation of the output property of the illumination device, making operation of the electronic device faster and more efficient, which conserves power and, for battery powered devices, increases the time between battery charges.

In some embodiments, in response to detecting the first input (e.g., 686 in FIG. 6J), method 700 includes in accordance with a determination that the first input meets second criteria (e.g., the input is a tap input or a stationary long press input) changing an on/off state of the illumination element (e.g., turning the illumination on if the illumination element is off or turning the illumination element off if the illumination element is on). Changing an on/off state of the illumination element in response to input meeting second criteria reduces accidental inputs and a number of inputs and time needed to perform an operation at the electronic device making operation of the electronic device faster and more efficient, which conserves power and, for battery powered devices, increases the time between battery charges.

In some embodiments the same input may meet both the first and second criteria, e.g., a long press with a drag may turn on the flashlight (second criteria) while the drag to the side may change the beam width. See for example, the various movements illustrated in FIGS. 6Ga-6Gd. In some embodiments the first and second criteria may be met by separate inputs, e.g., a tap or long press input may turn on the flashlight followed by another touch and drag input may change the beam width and/or brightness of the light beam.

In some embodiments, in response to detecting the first input (e.g., 636 in FIG. 6F), method 700 includes in accordance with a determination that the first input includes movement in a respective direction that meets third criteria (e.g., the input includes more than a threshold amount of movement and/or includes movement beyond a threshold location) turning off the illumination element. See for example FIG. 6Gc. Turning the illumination element off in response to an input having movement in a respective direction meeting third criteria reduces a number of inputs and time needed to control output of the illumination element making operation of the electronic device faster and more efficient, which conserves power and, for battery powered devices, increases the time between battery charges.

In some embodiments the respective direction in which movement meeting third criteria turns the illumination element off is opposite to a direction in which movement increases a brightness of the light beam. See for example FIG. 6Gc. In some embodiments turning off e.g., input movement in a respective direction meeting a third criteria, the illumination element may occur as part of a separate input.

In some embodiments, the first input (e.g., 636 in FIG. 6F) includes movement (e.g., X and/or Y in FIGS. 6Ga-6Gd), and the method 700 includes: in response to detecting the movement, in accordance with a determination that the first input corresponds to an adjustment of a parameter of the light (e.g., a brightness or beam width of the light) to (or beyond) a respective threshold (e.g., minimum $P1_{min}$ or $P2_{min}$ or maximum $P1_{max}$ or $P2_{max}$ value in FIGS. 6Ga-6Gd) generating, via one or more tactile output generators, a tactile output that corresponds to the adjustment of the parameter of the light to the respective threshold. Generating a tactile output when an adjustment to a parameter of the illumination device reaches a respective threshold provides the user with confirmation of the output property of the illumination device, making operation of the electronic device faster and more efficient, which conserves power and, for battery powered devices, increases the time between battery charges.

In some embodiments, the tactile output that corresponds to the adjustment of the parameter of the light to the respective threshold value is the same as a tactile output that is generated when the electronic device detects adjustment of other parameters of the electronic device to corresponding threshold values (e.g., when a volume, brightness, zoom level reaches a minimum or maximum threshold value). Providing the same tactile output that is generated when the electronic device detects adjustment of other parameters of other elements of the electronic device to corresponding threshold values provides the user with consistent confirmation of parameter threshold values, making operation of the electronic device faster and more efficient, which conserves power and, for battery powered devices, increases the time between battery charges.

In some embodiments, the adjustment parameter (e.g., P1 in FIGS. 6ga-6Gd) is a brightness of the light and the respective threshold value is a maximum or minimum brightness of the light. Generating a tactile output that corresponds to the adjustment of the brightness of the light output from an illumination device to a respective maximum or minimum, provides the user with confirmation of the output property of the illumination device, making operation of the electronic device faster and more efficient, which conserves power and, for battery powered devices, increases the time between battery charges.

In some embodiments, the adjustment parameter (e.g., P2 in FIGS. 6ga-6Gd) is a beam width of the light and the respective threshold value is a maximum or minimum beam width of the light. Generating a tactile output that corresponds to the adjustment of the beam width of the light output from an illumination device to a respective maximum or minimum, provides the user with confirmation of the output property of the illumination device, making operation of the electronic device faster and more efficient, which conserves power and, for battery powered devices, increases the time between battery charges.

In some embodiments, method 700 further includes in response to detecting one or more user inputs (e.g., the first input): displaying a graphical feedback indicator (e.g., 642 in FIG. 6K) that indicates a current state of the light beam, and generating, via a tactile output device, a first tactile output (e.g., 694 in FIG. 6K) corresponding to display of the graphical feedback indicator. Method 700 further includes detecting an input that includes movement corresponding to adjustment of a parameter of the light beam (e.g., a brightness and/or beam width), and in response to detecting the input that includes movement corresponding to adjustment of the parameter of the light beam, in accordance with a determination that the input corresponds to an adjustment of a parameter of the light beam (e.g., a brightness or beam width of the light) to (or beyond) a respective threshold (e.g., minimum or maximum value) generating, via one or more tactile output generators, a second tactile output that corresponds to the adjustment of the parameter of the light beam to the respective threshold, wherein the second haptic feedback (e.g., 696 in FIG. 6K) has a different degree of prominence (e.g., has a greater or lesser magnitude, duration and/or other indication of prominence) than the first tactile output. For example, in some embodiments the haptic output thresholds illustrated in graphs 698a-c of FIG. 6K further includes maximum and minimum thresholds for the brightness and beam width of the light beam 616 such that movement of the input 691 beyond a maximum and minimum threshold in one or more directions results in generation of a tactile feedback (e.g., the second tactile output).

Method 700 further includes in response to detecting the input that includes movement corresponding to adjustment of the parameter of the light beam, in accordance with a determination that the input corresponds to an adjustment of a parameter of the light (e.g., a brightness $Y_1$ or beam width of the light) that does not reach the respective threshold (e.g., minimum or maximum value) forgoing generating, via one or more tactile output generators, the second tactile output that corresponds to the adjustment of the parameter of the light to the respective threshold. For example, in some embodiments the haptic output thresholds illustrated in graphs 698a-c of FIG. 6K further includes maximum and minimum thresholds for the brightness and beam width of the light beam 616 such that movement of the input 691 beyond a maximum and minimum threshold in one or more directions results in generation of a tactile feedback (e.g., the second tactile output) and movement which is not beyond a maximum or minimum threshold does not result in output of a tactile feedback. Generating a first tactile output that corresponds to the display of the graphical feedback indicator and a second tactile output that corresponds to the adjustment of the parameter of the light to a respective threshold based on an input's movement provides the user with confirmation of the output property of the illumination device, making operation of the electronic device faster and more efficient, which conserves power and, for battery powered devices, increases the time between battery charges.

In some embodiments, the user interface (e.g., 600 in FIG. 6A) including the first user interface element is a wake screen, the wake screen being displayed upon activation of the electronic device from a low power state (e.g., a low power display state, a display off state, or a device off state). Enabling the adjustment of a beam width of a flashlight based on an input directed to a user interface element from a wake screen provides easy access to a beam width adjustment feature and the beam width of the flashlight to be adjusted with fewer inputs, thereby creating a more efficient human-machine interface. In some embodiments the wake screen requires confirmation of user access (e.g., inputting of a predefined gesture and or authentication input such as biometric authentication, and/or password or passcode authentication) before allowing access to some operations and/or applications associated with the electronic device.)

In some embodiments, the user interface (e.g., 600 in FIG. 6A) further includes status information (e.g., one or more application notifications, message notifications, and/or missed call notifications) displayed in the form of one or more selectable user interface objects (e.g., 602-606 in FIG. 6A), where selection of one of the one or more selectable user interface objects performs an operation associated with the notification (e.g., display an application user interface corresponding to an application notification, display message content corresponding to a message notification and/or initiating a phone call corresponding to a missed call notification). The user interface further displaying status information in the form of one or more selectable user interface objects provides easy access to the status information and applications associated with the status information allowing a user to respond to the status information with fewer inputs, thereby creating a more efficient human-machine interface. In some embodiments selection of one of the one or more selectable user interface elements activates a user access confirmation process.

In some embodiments, the user interface (e.g., 600 in FIG. 6A) is displayed upon activation of the electronic device, and the user interface limits (e.g., 662 in FIG. 6I) user access to one or more applications associated with the electronic device until a user access confirmation process (e.g., inputting of a predefined gesture and or authentication input such as biometric authentication, and/or password or passcode authentication) is completed. Limiting access to one or more applications associated with the electronic device until a user access confirmation process is completed prevents unintentional activation/input and increases security, thereby creating a more efficient human-machine interface.

In some embodiments the user interface (e.g., 600 in FIG. 6A) allows activation of one or more applications (e.g., a camera application in FIG. 6H) associated with the electronic device without completion of the user access confirmation process. Allowing activation of an application (e.g. camera) associated with the electronic device without completion of the user access confirmation provides easy access to the application features (e.g., visual media capturing) with fewer inputs, thereby creating a more efficient human-machine interface.

In some embodiments the user interface (e.g., 600 in FIG. 6A) is displayed upon activation of the electronic device, and the user interface limits user access (e.g., 662 in FIG. 6I) to one or more applications associated with the electronic device until confirmation of user access (e.g., inputting of a predefined gesture and or authentication input such as biometric authentication, and/or password or passcode authentication), and method 700 includes changing the beam width of the light emitted by the illumination element in response to the detection of the first input is performed without activation of the user access confirmation process. Changing of the beam width of a flashlight based on an input directed to a user interface element without activation of the user access confirmation process provides easy access to a beam width adjustment feature and the beam width of the flashlight to be adjusted with fewer inputs, thereby creating a more efficient human-machine interface.

In some embodiments, method 700 further includes in response to detecting the first input (e.g., 691 in FIG. 6K) is maintained for a predetermined time period (e.g., $T_{FB}$ in graph 698b of FIG. 6K) displaying a graphical feedback indicator (e.g., 642 in FIG. 6K) representing the illumination element in an off state. Displaying a graphical feedback indicator representing the illumination element in an off state in response to detecting the contact is maintained for a predetermined time period provides the user visual indication of the state of the illumination element, making operation of the electronic device faster and more efficient, which conserves power and, for battery powered devices, increases the time between battery charges.

In some embodiments, method 700 further includes detecting a lift off (e.g., complete lift off or a decrease in pressure/intensity of the contact) of the first input (e.g., 691 in FIG. 6K), and in response to detecting an end of the first input, refreshing the graphical feedback indicator (e.g., 642 in FIG. 6K) to reflect one or more current property settings (e.g., brightness or beam width) of the illumination element. Refreshing the graphical feedback indicator representing the illumination element in response to detecting an end of the input provides the user visual indication of the state of the illumination element, making operation of the electronic device faster and more efficient, which conserves power and, for battery powered devices, increases the time between battery charges.

In some embodiments, method 700 further includes detecting an end of the first input (e.g., complete lift off or a decrease in pressure/intensity of the contact) of the contact, and in response to detecting end of the first input removing the graphical feedback indicator. For example, detection of the lift off in FIG. 6K would further result in removal of the feedback indicator 642 sometime after detection of the lift off. Removing the graphical feedback indicator representing the illumination element in response to detecting an end of the input provides the user visual indication of the state of the illumination element, making operation of the electronic device faster and more efficient, which conserves power and, for battery powered devices, increases the time between battery charges.

In some embodiments the removal of the graphical feedback indicator occurs a predetermined time after detecting the end of the first input. For example, detection of the lift off in FIG. 6K would further result in removal of the feedback indicator 642 sometime after detection of the lift off. Delaying removal of the graphical feedback indicator representing the illumination element in response to detecting an end of the input for a predetermined time reduces unintentional detection of an end to input, making operation of the electronic device faster and more efficient, which conserves power and, for battery powered devices, increases the time between battery charges.

Note that details of the processes described above with respect to method 700 (e.g., FIG. 7) are also applicable in an analogous manner to the methods described below. For example, method 800 optionally includes one or more of the characteristics of the various methods described above with reference to method 700. For example, the control of the beam width described above may correspond to control of the one of the two visual output properties described below. For brevity, these details are not repeated below.

FIG. 8 is flow diagrams illustrating method 800 for adjusting first and second visual output properties (e.g., brightness and beam width of light beam output by illumination element 614 in FIG. 6A) using a first user interface element (e.g., flashlight affordance/icon 610 in FIGS. 6A-6F and 6K-6L) associated with control an output operation (e.g., light from an illumination element 614 in FIG. 6A).

Method 800 is performed at an electronic device (e.g., 100, 300, 500 in FIGS. 2, 4A, and 5A) that includes a display device, one or more input device (e.g., a touch-sensitive surface 112 in FIG. 6A) and an illumination element (e.g., 614 in FIG. 6A). In some embodiments, the display is a touch-screen display and the touch-sensitive surface is on or integrated with the display. In some embodiments, the display is separate from the touch-sensitive surface. Some operations in method 800 are, optionally, combined, the orders of some operations are, optionally, changed, and some operations are, optionally, omitted.

Method 800, which is performed at (and thus performed by) an electronic device (e.g., a smart phone, or tablet (e.g., 100, 300, 500 in FIGS. 2, 4A, and 5A)) with a display device, and one or more input devices (802), includes displaying (804), via the display, a user interface (e.g., wake screen or control center user interface) including a first user interface element (e.g., flashlight affordance/icon 610 in FIGS. 6A-6F and 6K-6L), the first user interface element being associated with control of an output operation (e.g., light from an illumination element (e.g., 614 in FIG. 6A) having first and second visual output properties (e.g., brightness and beam width) and an active and inactive state (e.g., on and off states). Method 800 further includes detecting (806), via the one or more input devices, an input (e.g., 618 in FIGS. 6C-6E) directed to the first user interface element. Method 800 further includes, in response (808) to detecting the input: in accordance with a determination (810) that the input includes movement in a first direction (e.g., up or down) while the output operation is in an active state (e.g., on), adjusting the first visual output property (e.g., brightness); and in accordance with a determination (812) that the input includes movement in a second direction (e.g., left or right) while the output operation is in an active state (e.g., on), adjusting the second visual output property (e.g., beam width). Examples of changes in brightness P1 and/or beam width P2 in accordance with detection of various movement in input 636 in FIG. 6F are discussed with reference to FIGS. 6F-6Gd.

Enabling a user to adjust multiple different properties of an output operation based on a direction of movement of the same input reduces a number of controls that need to be displayed, thereby creating a more efficient human-machine interface. For battery-operated electronic devices, enabling a user to activate locked-mode device features, while preventing accidental activation of such features conserves power and increases the time between battery charges, without unduly burdening the user of the device.

In some embodiments, the user interface including the first user interface element is a wake screen (e.g., 600 in FIGS. 6A-6E), the wake screen being displayed upon activation of the electronic device from a lower power state (e.g., a low power display state, a display off state, or a device off state). Enabling the adjustment of multiple different properties of an output operation (e.g., a flashlight) based on an input directed to a user interface element from a wake screen provides easy access to parameter adjustment features and the adjustment of the parameters of the output operation to be adjusted with fewer inputs, thereby creating a more efficient human-machine interface.)(In some embodiments the wake screen requires confirmation (e.g., 662 in FIG. 6I) of user access (e.g., inputting of a predefined gesture and or authentication input such as biometric authentication, and/or password or passcode authentication) before allowing access to some operations and/or applications (e.g., message application 664 in FIG. 6I) associated with the electronic device.

In some embodiments, the user interface (e.g., 672 in FIG. 6J) including the first user interface element (is a control center user interface, the control center user interface displaying shortcuts (e.g., affordance/icon) to one or more operations and/or applications associated with the electronic device in the form of selectable user interface objects. Enabling the adjustment of multiple different properties of an output operation (e.g., a flashlight) based on an input directed to a user interface element from a control center user interface provides easy access to parameter adjustment features and the adjustment of the parameters of the output operation to be adjusted with fewer inputs, thereby creating a more efficient human-machine interface.

In some embodiments, method 800 further includes in response to detecting the input (e.g., 636 in FIG. 6F): in accordance with a determination that the input includes movement in the first direction (e.g., Y in FIGS. 6ga-6Gd) while the output operation is in an inactive (e.g., off) state changing the output operation to an active (e.g., on) state. Changing the output operation to an on state when the input includes movement in a first direction while the output operation is in an off state, reduces a number of inputs and time needed to adjust the visual output properties of the output operation at the electronic device, thereby creating a more efficient human-machine interface.

In some embodiments, method 800 further includes in response to detecting the input (e.g., 636 in FIG. 6F): in accordance with a determination that the input includes movement in the second direction (e.g., X in FIGS. 6ga-6Gd) and the output operation is in an inactive state maintaining the output operation to the inactive state. Maintaining the output operation in an off state when the input includes movement in a second direction while the output operation is in an off state, reduces accidental activation of the output operation and conserves power, thereby creating a more efficient human-machine interface and for battery powered devices, increases the time between battery charges.

In some embodiments, method 800 further includes in response to detecting the input (e.g., 636 in FIG. 6F): in accordance with a determination that the input includes movement in both the first direction (e.g., Y in FIGS. 6Ga-6Gd) and the second direction (e.g., X in FIGS. 6ga-6Gd), adjusting the first visual output property (e.g., P1 in FIGS. 6Ga-6Gd) in accordance with movement in the first direction (e.g., adjusting a direction of change the first visual output property based on a direction of change of the movement in the first direction and/or adjusting an amount of change the first visual output property based on an amount of movement in the first direction) while maintaining the second visual output property (e.g., P2 in FIGS. 6Ga-6Gd) at a fixed value until the movement in the second direction exceeds a threshold amount of movement (e.g., $X_{min}$ in FIG. 6D) in the second direction. Adjusting the first visual output property in accordance with movement in the first direction while maintaining the second visual output property at a fixed value until the movement in the second direction exceeds a threshold amount in the second direction, reduces accidental adjustment of the second visual output property and conserves power, thereby creating a more efficient human-machine interface, and for battery powered devices, increases the time between battery charges.

In some embodiments, method 800 further includes after detecting at least the threshold amount of movement in the second direction, detecting movement of the input in the first direction and the second direction, and in response to detecting the movement of the input in the first direction and the second direction, adjusting (e.g., concurrently adjusting) both the first visual output property and second visual output property. See for example FIGS. 6Ga-6Gd. Adjusting both the first visual output property and the second visual output property based on the detected movement in the first direction and the second direction, reduces a number of inputs and time needed to adjust the visual output properties of the output operation at the electronic device, thereby creating a more efficient human-machine interface.

In some embodiments, method 800 further includes in response to detecting the input (e.g., 636 in FIG. 6F): in accordance with a determination that the input includes movement in the first and second direction, adjusting the second visual output property in accordance with movement in the second direction (e.g., adjusting a direction of change of the second visual output property based on a direction of change of the movement in the second direction and/or adjusting an amount of change of the second visual output property based on an amount of movement in the second direction) while maintaining the first visual output property at a fixed value until the movement in the first direction exceeds a threshold amount. See for example FIGS. 6Ga-6Gd. Adjusting the second visual output property in accordance with movement in the second direction while maintaining the first visual output property at a fixed value until the movement in the first direction exceeds a threshold amount in the first direction, reduces accidental adjustment of the first visual output property and conserves power, thereby creating a more efficient human-machine interface, and for battery powered devices, increases the time between battery charges.

In some embodiments, method 800 further includes after detecting at least the threshold amount of movement in the first direction, detecting movement of the input in the first direction and the second direction, and in response to detecting the movement of the input in the first direction and the second direction, adjusting (e.g., concurrently adjusting) both the first visual output property and the second visual output property. See for example FIGS. 6Ga-6Gd. Adjusting both the first visual output property and the second visual output property based on the detected movement in the first direction and the second direction, reduces a number of inputs and time needed to adjust the visual output properties of the output operation at the electronic device, thereby creating a more efficient human-machine interface.

In some embodiments, method 800 further includes in response to detecting the input (e.g., 636 in FIG. 6F): in accordance with a determination that the input includes movement in both the first direction and the second direction, adjusting (e.g., concurrently adjusting) the first visual output property and second visual output property. See for example FIGS. 6Ga-6Gd. Adjusting both the first visual output property and the second visual output property based on the detected movement in the first direction and the second direction, reduces a number of inputs and time needed to adjust the visual output properties of the output operation at the electronic device, thereby creating a more efficient human-machine interface.

In some embodiments, the output operation is associated with an illumination element, the first visual output property is a first light emission property of the illumination element, and the second visual output property is a second light emission property of the illumination element that is different from the first light emission property of the illumination element. Enabling a user to adjust multiple, different, light emission properties of an illumination element based on a direction of movement of the same input reduces a number of controls that need to be displayed, thereby creating a more efficient human-machine interface.

In some embodiments the first light emission property is a brightness (e.g., P1 in FIGS. 6Ga-6Gd) of a light beam emitted from the illumination element. Enabling a user to adjust multiple, different, light emission properties, including a brightness of a light beam emitted by an illumination element based on a direction of movement of the same input reduces a number of controls that need to be displayed, thereby creating a more efficient human-machine interface.

In some embodiments the second light emission property is a width (e.g., P2 in FIGS. 6Ga-6Gd) of a light beam emitted from the illumination element. Enabling a user to adjust multiple, different, light emission properties, including a beam width of a light beam emitted by an illumination element based on a direction of movement of the same input reduces a number of controls that need to be displayed, thereby creating a more efficient human-machine interface.

In some embodiments, method 800 further includes displaying a graphical feedback indicator (e.g., 640, 642 in FIG. 6N) that indicates a current state of the first visual output property and the second visual output property, the current state including a direction and/or magnitude of changes to the first visual output property and the second visual output property. See for example FIGS. 6Ga-6Gd. By transforming the graphical feedback indicator in accordance with the state of the first and second output properties, the user receives visual confirmation that the device is responding to the user's touch input, which helps the user to more accurately provide inputs without making mistakes that take time and additional inputs to correct, which in turn makes use of the device more efficient in terms of both time and battery usage.

In some embodiments the graphical feedback indicator (e.g., 642 in FIG. 6K) is displayed in response to detection that the input has been is maintained for at least a predefined time period (e.g., $T_{FB}$ in graph 698b of FIG. 6K). Displaying the graphical feedback indicator in response to detecting the input is maintained for a predetermined time period reduces accidental display of the graphical feedback indicator and provides the user visual indication of the state of the illumination element, making operation of the electronic device faster and more efficient, which conserves power and, for battery powered devices, increases the time between battery charges.

In some embodiments, method 800 further includes in response to detecting the input (e.g., 636 in FIG. 6F): in accordance with a determination that the input is maintained for a respective time period while the output operation is in an inactive state, transitioning the output operation to an active state. See for example FIGS. 6Ga-6Gd. Transitioning the output operation to an on state when the input is maintained for a respective time period while the output operation is in an off state, reduces accidental activation of the output operation and conserves power thereby creating a more efficient human-machine interface and for battery powered devices, increases the time between battery charges.

In some embodiments, method 800 further includes in response to detecting the input (e.g., 636 in FIG. 6F), in accordance with a determination that the input moved more than a threshold amount in a third direction (e.g., to the left or to the right or down) during the respective time period while the output operation is in the inactive state, forgoing transitioning of the output operation to an active state. See for example FIGS. 6Ga-6Gd. Forgoing the transitioning of the output operation to an on state when the input includes movement in a third direction during the respective time period while the output operation is in an off state, reduces accidental activation of the output operation and conserves power thereby creating a more efficient human-machine interface and for battery powered devices, increases the time between battery charges.

In some embodiments, method 800 further includes in response to detecting the input (e.g., 636 in FIG. 6F), in accordance with a determination that the input moved more than a threshold amount in a fourth direction (e.g., up) during the respective time period while the output operation is in the inactive state, transitioning the output operation to the active state and setting one or more of the first visual output property and the second visual output property to a value determined based on a magnitude of the movement of the input in the fourth direction. See for example FIGS. 6Ga-6Gd. Transitioning the output operation to an on state and setting one or more of the visual output properties to a value determined based on a magnitude of movement in a fourth direction of the same input reduces a number of controls that need to be displayed, thereby creating a more efficient human-machine interface.

In some embodiments method 800 further includes in response to detecting the input (e.g., 636 in FIG. 6F), in accordance with a determination that the input moved less than a threshold amount during a respective time period while the output operation is in the active state, transitioning the output operation to an inactive (e.g., off) state. See for example FIGS. 6Ga-6Gd. Transitioning the output operation to an off state when the input is maintained for a respective time period while the output operation is in an on state, conserves power thereby creating a more efficient human-machine interface and for battery powered devices, increases the time between battery charges.

In some embodiments, method 800 further includes in response to detecting the input (e.g., 636 in FIG. 6F), in accordance with a determination that the input moved more than a threshold amount in a fourth direction (e.g., to the right, to the left, or down) during the respective time period while the output operation is in the active state, maintaining the output operation in the active state. See for example FIGS. 6Ga-6Gd. Maintaining the output operation in an on state when the input includes a threshold amount of movement in a fourth direction during the respective time period while the output operation is in an on state, reduces accidental deactivation of the output operation that takes time and additional inputs to correct, which in turn makes use of the device more efficient in terms of both time and battery usage.

In some embodiments, method 800 further includes, in response to detecting the input (e.g., 636 in FIG. 6F), in accordance with a determination that the input moved more than a threshold amount in the first direction (e.g., up) during the respective time period while the output operation is in the active state, setting one or more of the first visual output property and the second visual output property to a value determined based on a magnitude of the movement of the input in the first direction. See for example FIGS. 6Ga-6Gd. Setting one or more of the visual output properties to a value determined based on a magnitude of the movement in a fourth direction of the same input reduces a number of controls that need to be displayed, thereby creating a more efficient human-machine interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
at an electronic device with a display device, one or more input elements, and an illumination element:
displaying, via the display device, a user interface including a first user interface element, the first user interface element being associated with the illumination element;
detecting, via the one or more input elements, a first input at a location corresponding to the first user interface element, wherein the first input includes movement; and
in response to detecting the first input:
in accordance with a determination that the movement in the first input includes movement in a first direction, changing a beam width of a light beam emitted by the illumination element from a first beam width to a second beam width, wherein the second beam width is different from the first beam width; and
in accordance with a determination that the movement in the first input includes movement in a second direction that is different from the first direction, changing a brightness of the light beam emitted by the illumination element from a first brightness to a second brightness, wherein the second brightness is different from the first brightness.

2. The method of claim 1, further comprising:
receiving one or more second inputs at the electronic device corresponding to a request to capture visual media using one or more image sensors of the electronic device; and
in response to receiving the one or more second inputs, capturing visual media using the one or more image sensors, and while capturing the visual media using the one or more image sensors, emitting light with the illumination element to illuminate a subject of the visual media.

3. The method of claim 1, wherein:
prior to detecting the first input, the illumination element is not emitting light; and
the method includes, in response to detecting at least a portion of the first input that meets second criteria, starting to emit light via the illumination element.

4. The method of claim 1, wherein changing the beam width of the light beam emitted by the illumination element includes:
changing the beam width of the light beam through a plurality of values based on movement of the detected first input.

5. The method of claim 1, wherein the first direction corresponds to movement along a first axis.

6. The method of claim 5, wherein the second direction corresponds to movement along a second axis that is different from the first axis.

7. The method of claim 1, further comprising:
in accordance with a determination that the detected first input includes movement in the first direction and the second direction, changing both the brightness of the light beam and the beam width of the light beam based on the detected first input.

8. The method of claim 7, wherein changing both the brightness of the light beam and the beam width of the light beam based on the detected first input includes changing the beam width from the first beam width to the second beam width while changing the brightness from the first brightness to the second brightness, wherein:
the first beam width is greater than the second beam width; and
the first brightness is less than the second brightness.

9. The method of claim 7, wherein changing both the brightness of the light beam and the beam width of the light beam based on the detected first input includes changing the beam width from the first beam width to the second beam width while changing the brightness from the first brightness to the second brightness, wherein:
the first beam width is less than the second beam width; and
the first brightness is greater than the second brightness.

10. The method of claim 1, further comprising:
in response to detecting the first input:
displaying a graphical feedback indicator that graphically indicates a direction and/or magnitude of changes to the beam width of the light beam.

11. The method of claim 10, further comprising:
while continuing to detect the first input, changing a size and/or shape of the graphical feedback indicator based on the first input; and
in response to detecting an end of the first input, in accordance with a determination that a size and/or shape of the graphical feedback indicator is a size and/or shape that is beyond a threshold size and/or shape that is associated with a respective threshold value for the beam width of the light beam, changing a size and/or shape of the graphical feedback indicator to a size and/or shape that is associated with the respective threshold value from a respective size and/or respective shape of the graphical feedback indicator when the end of the input was detected.

12. The method of claim 10, wherein:
a width of the graphical feedback indicator is narrower when the beam width of the light beam is narrower; and
a width of the graphical feedback indicator is wider when the beam width of the light beam is wider.

13. The method of claim 10, wherein:
a length of the graphical feedback indicator is longer when the beam width of the light beam is narrower; and
a length of the graphical feedback indicator is shorter when the beam width of the light beam is wider.

14. The method of claim 10, wherein the graphical feedback indicator also graphically indicates a direction and/or magnitude of changes to the brightness of the light beam in addition to indicating the direction and/or magnitude of changes to the beam width of the light beam.

15. The method of claim 1, further comprising:
in response to detecting the first input:
displaying a graphical feedback indicator that graphically indicates a direction and/or magnitude of changes to the brightness of the light beam.

16. The method of claim 15, further comprising:
while continuing to detect the first input, changing a size and/or shape of the graphical feedback indicator based on the first input; and
in response to detecting an end of the first input, in accordance with a determination that a size and/or shape of the graphical feedback indicator is a size and/or shape that is beyond a threshold size and/or shape that is associated with a respective threshold value for the brightness of the light beam, changing a size and/or shape of the graphical feedback indicator to a size and/or shape that is associated with the respective threshold value from a respective size and/or respective shape of the graphical feedback indicator when the end of the input was detected.

17. The method of claim 1, further comprising, in response to detecting the first input, in accordance with a determination that the first input meets second criteria, changing an on/off state of the illumination element.

18. The method of claim 1, further comprising, in response to detecting the first input, in accordance with a determination that the first input includes movement in a respective direction that meets third criteria, turning off the illumination element.

19. The method of claim 1, wherein the first input includes movement, and the method includes:
in response to detecting the movement, in accordance with a determination that the first input corresponds to an adjustment of a parameter of the light beam to a respective threshold value, generating, via one or more tactile output generators, a tactile output that corresponds to the adjustment of the parameter of the light beam to the respective threshold value.

20. The method of claim 19, wherein the tactile output that corresponds to the adjustment of the parameter of the light beam to the respective threshold value is the same as a tactile output that is generated when the electronic device detects adjustment of other parameters of the electronic device to corresponding threshold values.

21. The method of claim 20, wherein the adjustment of the parameter is the brightness of the light beam and the respective threshold value is a maximum or minimum brightness of the light beam.

22. The method of claim 20, wherein the adjustment of the parameter is the beam width of the light beam and the respective threshold value is a maximum or minimum beam width of the light beam.

23. The method of claim 1, further comprising:
in response to detecting one or more user inputs:
displaying a graphical feedback indicator that indicates a current state of the light beam; and
generating, via a tactile output device, a first tactile output corresponding to display of the graphical feedback indicator; and
detecting an input that includes movement corresponding to an adjustment of a parameter of the light beam; and
in response to detecting the input that includes movement corresponding to the adjustment of the parameter of the light beam, in accordance with a determination that the input corresponds to the adjustment of the parameter of the light beam to a respective threshold generating, via one or more tactile output generators, a second tactile output that corresponds to the adjustment of the parameter of the light beam to the respective threshold, wherein the second tactile output has a different degree of prominence than the first tactile output,
in response to detecting the input that includes movement corresponding to the adjustment of the parameter of the light beam, in accordance with a determination that the input corresponds to the adjustment of the parameter of the light beam that does not reach the respective threshold, forgoing generating, via the one or more tactile output generators, the second tactile output that corresponds to the adjustment of the parameter of the light beam to the respective threshold.

24. The method of claim 1, wherein the user interface including the first user interface element is a wake screen, the wake screen being displayed upon activation of the electronic device from a low power state.

25. The method of claim 24, wherein the user interface further includes status information displayed in the form of one or more selectable user interface objects, where selection of one of the one or more selectable user interface objects performs an operation associated with a notification.

26. The method of claim 1, wherein the user interface is displayed upon activation of the electronic device, and the user interface limits user access to one or more applications associated with the electronic device until a user access confirmation process is completed.

27. The method of claim 26, wherein the user interface allows activation of one or more applications associated with the electronic device without completion of the user access confirmation process.

28. The method of claim 1, wherein the user interface is displayed upon activation of the electronic device, and the user interface limits user access to one or more applications associated with the electronic device until confirmation of user access; and
changing the beam width of the light beam emitted by the illumination element in response to detecting the first input is performed without activation of a user access confirmation process.

29. The method of claim 1, further comprising:
in response to detecting the first input is maintained for a predetermined time period, displaying a graphical feedback indicator representing the illumination element in an off state.

30. The method of claim 29, further comprising:
detecting a lift off of the first input; and
in response to detecting an end of the first input, refreshing the graphical feedback indicator to reflect one or more current property settings of the illumination element.

31. The method of claim 29, further comprising:
detecting an end of the first input; and
in response to detecting the end of the first input, removing the graphical feedback indicator.

32. The method of claim 31, wherein the display device is on a front side of the electronic device and the illumination element on a back side of the electronic device.

33. A non-transitory computer readable storage medium storing one or more programs configured to be executed by one or more processors of an electronic device having a display device, one or more input elements, and an illumination element, the one or more programs including instructions for:
displaying, via the display device, a user interface including a first user interface element, the first user interface element being associated with the illumination element;

detecting, via the one or more input elements, a first input at a location corresponding to the first user interface element, wherein the first input includes movement; and in response to detecting the first input:
in accordance with a determination that the movement in the first input includes movement in a first direction, changing a beam width of a light beam emitted by the illumination element from a first beam width to a second beam width, wherein the second beam width is different from the first beam width; and
in accordance with a determination that the movement in the first input includes movement in a second direction that is different from the first direction, changing a brightness of the light beam emitted by the illumination element from a first brightness to a second brightness, wherein the second brightness is different from the first brightness.

34. The non-transitory computer readable storage medium of claim 33, wherein the one or more programs include instructions that when executed by the one or more processors of the electronic device cause the electronic device to perform operations, including:
receiving one or more second inputs at the electronic device corresponding to a request to capture visual media using one or more image sensors of the electronic device; and
in response to receiving the one or more second inputs, capturing visual media using the one or more image sensors, and while capturing the visual media using the one or more image sensors, emitting light with the illumination element to illuminate a subject of the visual media.

35. The non-transitory computer readable storage medium of claim 33, wherein:
prior to detecting the first input, the illumination element is not emitting light; and
the one or more programs include instructions that when executed by the one or more processors of the electronic device cause the electronic device to perform operations, including:
in response to detecting at least a portion of the first input that meets second criteria, starting to emit light via the illumination element.

36. The non-transitory computer readable storage medium of claim 33, wherein the one or more programs include instructions that when executed by the one or more processors of the electronic device cause the electronic device to perform operations, including:
in accordance with a determination that the detected first input includes movement in the first direction and the second direction, changing both the brightness of the light beam and the beam width of the light beam based on the detected first input.

37. The non-transitory computer readable storage medium of claim 33, wherein the one or more programs include instructions that when executed by the one or more processors of the electronic device cause the electronic device to perform operations, including:
in response to detecting the first input:
displaying a graphical feedback indicator that graphically indicates a direction and/or magnitude of changes to the beam width of the light beam;
while continuing to detect the first input, changing a size and/or shape of the graphical feedback indicator based on the first input; and
in response to detecting an end of the first input, in accordance with a determination that a size and/or shape of the graphical feedback indicator is a size and/or shape that is beyond a threshold size and/or shape that is associated with a respective threshold value for the beam width of the light beam, changing a size and/or shape of the graphical feedback indicator to a size and/or shape that is associated with the respective threshold value from a respective size and/or respective shape of the graphical feedback indicator when the end of the input was detected.

38. The non-transitory computer readable storage medium of claim 33, wherein the one or more programs include instructions that when executed by the one or more processors of the electronic device cause the electronic device to perform operations, including:
in response to detecting the first input:
displaying a graphical feedback indicator that graphically indicates a direction and/or magnitude of changes to the brightness of the light beam.

39. The non-transitory computer readable storage medium of claim 38, wherein the one or more programs include instructions that when executed by the one or more processors of the electronic device cause the electronic device to perform operations, including:
while continuing to detect the first input, changing a size and/or shape of the graphical feedback indicator based on the first input; and
in response to detecting an end of the first input, in accordance with a determination that a size and/or shape of the graphical feedback indicator is a size and/or shape that is beyond a threshold size and/or shape that is associated with a respective threshold value for the brightness of the light beam, changing a size and/or shape of the graphical feedback indicator to a size and/or shape that is associated with the respective threshold value from a respective size and/or respective shape of the graphical feedback indicator when the end of the input was detected.

40. The non-transitory computer readable storage medium of claim 33, wherein the one or more programs include instructions that when executed by the one or more processors of the electronic device cause the electronic device to perform operations, including:
in response to detecting the first input, in accordance with a determination that the first input meets second criteria, changing an on/off state of the illumination element.

41. The non-transitory computer readable storage medium of claim 33, wherein the one or more programs include instructions that when executed by the one or more processors of the electronic device cause the electronic device to perform operations, including:
in response to detecting the first input, in accordance with a determination that the first input includes movement in a respective direction that meets third criteria, turning off the illumination element.

42. The non-transitory computer readable storage medium of claim 33, wherein:
the first input includes movement; and
the one or more programs include instructions that when executed by the one or more processors of the electronic device cause the electronic device to perform operations, including:
in response to detecting the movement, in accordance with a determination that the first input corresponds to an adjustment of a parameter of the light beam to a respective threshold value, generating, via one or more tactile output generators, a tactile output that corresponds to the adjustment of the parameter of the light beam to the respective threshold value.

43. The non-transitory computer readable storage medium of claim 33, wherein the one or more programs include instructions that when executed by the one or more processors of the electronic device cause the electronic device to perform operations, including:
in response to detecting one or more user inputs:
displaying a graphical feedback indicator that indicates a current state of the light beam; and
generating, via a tactile output device, a first tactile output corresponding to display of the graphical feedback indicator; and
detecting an input that includes movement corresponding to an adjustment of a parameter of the light beam; and
in response to detecting the input that includes movement corresponding to the adjustment of the parameter of the light beam, in accordance with a determination that the input corresponds to the adjustment of the parameter of the light beam to a respective threshold, generating, via one or more tactile output generators, a second tactile output that corresponds to the adjustment of the parameter of the light beam to the respective threshold, wherein the second tactile output has a different degree of prominence than the first tactile output,
in response to detecting the input that includes movement corresponding to the adjustment of the parameter of the light beam, in accordance with a determination that the input corresponds to the adjustment of the parameter of the light beam that does not reach the respective threshold, forgoing generating, via the one or more tactile output generators, the second tactile output that corresponds to the adjustment of the parameter of the light beam to the respective threshold.

44. The non-transitory computer readable storage medium of claim 33, wherein the one or more programs include instructions that when executed by the one or more processors of the electronic device cause the electronic device to perform operations, including:
in response to detecting the first input is maintained for a predetermined time period, displaying a graphical feedback indicator representing the illumination element in an off state.

45. An electronic device, comprising:
a display device;
one or more input elements;
an illumination element;
one or more processors; and
memory storing one or more programs configured to be executed by the one or more processors, the one or more programs including instructions for:
displaying, via the display device, a user interface including a first user interface element, the first user interface element being associated with the illumination element;
detecting, via the one or more input elements, a first input at a location corresponding to the first user interface element, wherein the first input includes movement; and
in response to detecting the first input:
in accordance with a determination that the movement in the first input includes movement in a first direction, changing a beam width of a light beam emitted by the illumination element from a first beam width to a second beam width, wherein the second beam width is different from the first beam width; and
in accordance with a determination that the movement in the first input includes movement in a second direction that is different from the first direction, changing a brightness of the light beam emitted by the illumination element from a first brightness to a second brightness, wherein the second brightness is different from the first brightness.

46. The electronic device of claim 45, wherein the one or more programs include instructions for:
receiving one or more second inputs at the electronic device corresponding to a request to capture visual media using one or more image sensors of the electronic device; and
in response to receiving the one or more second inputs, capturing visual media using the one or more image sensors, and while capturing the visual media using the one or more image sensors, emitting light with the illumination element to illuminate a subject of the visual media.

47. The electronic device of claim 45, wherein:
prior to detecting the first input, the illumination element is not emitting light; and
the one or more programs include instructions for:
in response to detecting at least a portion of the first input that meets second criteria, starting to emit light via the illumination element.

48. The electronic device of claim 45, wherein the one or more programs include instructions for:
in accordance with a determination that the detected first input includes movement in the first direction and the second direction, changing both the brightness of the light beam and the beam width of the light beam based on the detected first input.

49. The electronic device of claim 45, wherein the one or more programs include instructions for:
in response to detecting the first input:
displaying a graphical feedback indicator that graphically indicates a direction and/or magnitude of changes to the beam width of the light beam;
while continuing to detect the first input, changing a size and/or shape of the graphical feedback indicator based on the first input; and
in response to detecting an end of the first input, in accordance with a determination that a size and/or shape of the graphical feedback indicator is a size and/or shape that is beyond a threshold size and/or shape that is associated with a respective threshold value for the beam width of the light beam, changing a size and/or shape of the graphical feedback indicator to a size and/or shape that is associated with the respective threshold value from a respective size and/or respective shape of the graphical feedback indicator when the end of the input was detected.

50. The electronic device of claim 45, wherein the one or more programs include instructions for:
in response to detecting the first input:
displaying a graphical feedback indicator that graphically indicates a direction and/or magnitude of changes to the brightness of the light beam.

51. The electronic device of claim 50, wherein the one or more programs include instructions for:

while continuing to detect the first input, changing a size and/or shape of the graphical feedback indicator based on the first input; and in response to detecting an end of the first input, in accordance with a determination that a size and/or shape of the graphical feedback indicator is a size and/or shape that is beyond a threshold size and/or shape that is associated with a respective threshold value for the brightness of the light beam, changing a size and/or shape of the graphical feedback indicator to a size and/or shape that is associated with the respective threshold value from a respective size and/or respective shape of the graphical feedback indicator when the end of the input was detected.

52. The electronic device of claim 45, wherein the one or more programs include instructions for:

in response to detecting the first input, in accordance with a determination that the first input meets second criteria, changing an on/off state of the illumination element.

53. The electronic device of claim 45, wherein the one or more programs include instructions for:

in response to detecting the first input, in accordance with a determination that the first input includes movement in a respective direction that meets third criteria, turning off the illumination element.

54. The electronic device of claim 34, wherein:

the first input includes movement; and the one or more programs include instructions for:

in response to detecting the movement, in accordance with a determination that the first input corresponds to an adjustment of a parameter of the light beam to a respective threshold value, generating, via one or more tactile output generators, a tactile output that corresponds to the adjustment of the parameter of the light beam to the respective threshold value.

55. The electronic device of claim 45, wherein the one or more programs include instructions for:

in response to detecting one or more user inputs:

displaying a graphical feedback indicator that indicates a current state of the light beam; and generating, via a tactile output device, a first tactile output corresponding to display of the graphical feedback indicator; and detecting an input that includes movement corresponding to an adjustment of a parameter of the light beam; and in response to detecting the input that includes movement corresponding to the adjustment of the parameter of the light beam, in accordance with a determination that the input corresponds to the adjustment of the parameter of the light beam to a respective threshold, generating, via one or more tactile output generators, a second tactile output that corresponds to the adjustment of the parameter of the light beam to the respective threshold, wherein the second tactile output has a different degree of prominence than the first tactile output, in response to detecting the input that includes movement corresponding to the adjustment of the parameter of the light beam, in accordance with a determination that the input corresponds to the adjustment of the parameter of the light beam that does not reach the respective threshold, forgoing generating, via the one or more tactile output generators, the second tactile output that corresponds to the adjustment of the parameter of the light beam to the respective threshold.

56. The electronic device of claim 45, wherein the one or more programs include instructions for:

in response to detecting the first input is maintained for a predetermined time period, displaying a graphical feedback indicator representing the illumination element in an off state.

* * * * *